US011222310B2

(12) United States Patent
Janapareddy et al.

(10) Patent No.: US 11,222,310 B2
(45) Date of Patent: Jan. 11, 2022

(54) AUTOMATIC TAGGING FOR ONLINE JOB LISTINGS

(71) Applicant: Jobiak LLC, Westford, MA (US)

(72) Inventors: Venkata Janapareddy, Westford, MA (US); Kenneth B. Baldwin, Corvallis, OR (US); Jim Shur, Barcelona (ES); Elie Raad, Mougins (FR)

(73) Assignee: JOBIAK LLC, Westford, MA (US)

( * ) Notice: Subject to any disclaimer, the term of this patent is extended or adjusted under 35 U.S.C. 154(b) by 755 days.

(21) Appl. No.: 16/114,015

(22) Filed: Aug. 27, 2018

(65) Prior Publication Data

US 2020/0065770 A1    Feb. 27, 2020

(51) Int. Cl.
| | |
|---|---|
| *G06F 40/174* | (2020.01) |
| *G06Q 10/10* | (2012.01) |
| *G06F 8/38* | (2018.01) |
| *G06N 5/04* | (2006.01) |
| *G06N 20/00* | (2019.01) |

(52) U.S. Cl.
CPC .......... *G06Q 10/1053* (2013.01); *G06F 8/38* (2013.01); *G06F 40/174* (2020.01); *G06N 5/046* (2013.01); *G06N 20/00* (2019.01)

(58) Field of Classification Search
CPC .... G06Q 10/1053; G06N 20/00; G06N 5/046; G06F 40/174; G06F 8/38
See application file for complete search history.

(56) References Cited

U.S. PATENT DOCUMENTS

| | | | |
|---|---|---|---|
| 6,681,223 B1 | 1/2004 | Sundaresan | |
| 7,702,674 B2 | 4/2010 | Hyder | |
| 2009/0276415 A1* | 11/2009 | Dane | ...................... G06F 16/313 |
| 2010/0332304 A1* | 12/2010 | Higgins | ............. G06Q 30/0222 |
| | | | 705/14.16 |
| 2011/0099118 A1* | 4/2011 | Rudloff | .................. G06Q 10/00 |
| | | | 705/321 |
| 2013/0339337 A1 | 12/2013 | Alkhateeb et al. | |
| 2015/0127567 A1* | 5/2015 | Menon | ............... G06Q 10/1053 |
| | | | 705/321 |

(Continued)

OTHER PUBLICATIONS

Written Opinion of the International Searching Authority dated Dec. 13, 2019 in PCT/US2019/048033 (6 pages).

(Continued)

*Primary Examiner* — Beau D Spratt
(74) *Attorney, Agent, or Firm* — FisherBroyles LLP; Micah D. Stolowitz

(57) ABSTRACT

Methods and systems receive machine-readable input data describing a job listing or employment opportunity. The system scans the input data and software algorithms process it to predict specific information required by a particular html schema. To predict the information required by the schema, in one aspect, the system applies machine learning tools, for example, prediction models, which may be generated from training data selected from large job listing data collections, and specifically adapted and tuned for each field of interest, for example, job description, job location, and salary. This information is used to generate structured data, for example, html code, consistent with the schema for automatic insertion into a web page to comply with the schema and make the listing widely available to automated search processes.

20 Claims, 18 Drawing Sheets

(56) References Cited

U.S. PATENT DOCUMENTS

2018/0165364 A1   6/2018  Mehta et al.
2018/0181544 A1*  6/2018  Zhang ................. G06N 3/0454
2018/0181915 A1*  6/2018  Chen .................. G06Q 10/1053

OTHER PUBLICATIONS

Krestel et al. 'Latent Dirichlet Allocation for Tag Recommendation.' Proceedings of the 2009 ACM Conference on Recommender systems, Oct. 25, 2009, pp. 1-8.

* cited by examiner

Jobiak
YOUR PROGRESS

87% COMPLETE

REQUIRED
- Company
- Job Title
- Location
- Description
- Date Posted
- Valid Through OPTIONAL
- Employment Type
- Salary
- Job ID Number

910

Part-Time Campus Associate 920

Job ID: SF180014715 | Amazon Pickup Points LLC

DESCRIPTION

940

*Stop reading about all those cool, innovative companies and JOIN ONE! Submit your resume and apply today!*

If you want to work for a great company, take satisfaction in seeing the delighted smiles of customers and most importantly, want schedule flexibility while working on an exciting new service, then join us in making Amazon history! Amazon is launching a new way of getting customers the products they love right in your community. Help create an awesome experience that Amazon customers can't live without!

Help us bring the ease of ordering from Amazon even further - straight to the Boston - Central Square community! We are looking for students and leaders who are ready to delight our customers with rock star quality service, have an up-for-anything attitude, and thrive in an ever-changing environment. Want to be a part of the smile on the box and bringing the next big thing to your community? Read on, apply, and submit your resume!

*Things you should know about working in an Amazon Campus Pickup Point:*

- Customer-obsession. It makes your day to make someone else happy.
- Quality is key. You have high standards and it shows in your work. We'll hold you to it, but only because we know our associates can handle it.
- Flexible like Gumby. You don't mind a curve ball every once in a while and you can be flexible in responsibilities
- Cool with casual. A relaxed dress code means it's casual Friday, every day.

*Got it? Okay, but what will you actually be doing?*

- Receiving, picking, and random stowing of packages
- Put the pick-up in pickup point - check customers in at the Assisted Pickup Desk
- Lend a hand - assist customers and problem-solve scenarios such as missing and/or damaged packages
- You have it covered - open and close the store and cover leadership responsibilities
- Keep it clean - help maintain a clean and organized workspace
- Other duties as needed

*Let's sweeten the deal...*

- Competitive pay
- Biweekly pay schedule
- Flexible work scheduling, we work with your school schedule
- Employee discount
- Employee Assistance Program
- On-the-job training and skill development

Apply now

Job details 930

- USA, MA, Cambridge
- Fulfillment / Warehouse Associate

Share this job

Related jobs

Amazon Warehouse Fulfillment Associate
USA, OH, Columbus

Campus Associate Part-Time - WIS1
USA, WI, Madison

Seasonal Campus Associate Part Time - DEP1
USA, IL, Chicago

Seasonal Campus Associate Part Time - PUR1
USA, IN, West Lafayette

Campus Associate Part-Time - CIN1
USA, OH, Cincinnati

FIG. 9A    To FIG. 9B

*Hourly Pay Rate:* $13.50

*We want you to join the team if you can check these boxes:*

- Flex, not just your muscles - you are willing and able to work a variety of shifts and job duties
- Let's get physical - you must be able to lift up to 49 pounds with or without reasonable accommodation, stand/walk for up to 10-12 hours, and be able to frequently push, pull, squat, bend, and reach
- School spirit - you must enjoy working with students. Student at the Massachusetts Institute of Technology (MIT) or Harvard University? Even better!
- Resume is submitted

BASIC QUALIFICATIONS

*Basic Qualifications (because compliance asked us nicely to list these out ...)*

- Must be at least 18 years old
- Have obtained a High School diploma or equivalent
- Comfortable communicating directly with our customers both verbally and in writing
- English literacy Like what you see? Double tap (or just click), submit your application, and attach your resume!

Amazon.com is an Equal Opportunity-Affirmative Action Employer - Minority / Female / Disability / Veteran / Gender Identity / Sexual Orientation From FIG. 9A

⚠ YOU NEED TO FINISH DEFINING THE REQUIRED TAGS BEFORE POSTING THIS JOB.

[ SIGN-UP ]   [ POST TO WEB SITE ]   } 932

Jobick

YOUR PROGRESS

87% COMPLETE

REQUIRED

- Company ⌄
- Job Title ⌄
  - Campus Associate 93%
  - Campus RA 86%
  - Lunch Lady 45%
  - Resident Genius 27%
  - Chess Coach 22%
- Location ⌄
- Description ⌄
- Date Posted ⌄
- Valid Through ⌄

OPTIONAL

- Employment Type ⌄
- Salary ⌄
- Job ID Number ⌄

910

---

Part - Time Campus Associate | JOB TITLE | 920

Job ID: SF180014715 | Amazon Pickup Points LLC

[ Apply now ]

DESCRIPTION

940

*Stop reading about all those cool, innovative companies and JOIN ONE! Submit your resume and apply today!*

If you want to work for a great company, take satisfaction in seeing the delighted smiles of customers and most importantly, want schedule flexibility while working on an exciting new service, then join us in making Amazon history! Amazon is launching a new way of getting customers the products they love right in your community. Help create an awesome experience that Amazon customers can't live without!

Help us bring the ease of ordering from Amazon even further - straight to the Boston - Central Square community! We are looking for students and leaders who are ready to delight our customers with rock star-quality service, have an up-for-anything attitude, and thrive in an ever-changing environment. Want to be a part of the smile on the box and bringing the next big thing to your community? Read on, apply, and submit your resume!

Things you should know about working in an Amazon Campus Pickup Point:

- Customer-obsession. It makes your day to make someone else happy.
- Quality is key. You have high standards and it shows in your work. We'll hold you to it, but only because we know our associates can handle it.
- Flexible like Gumby. You don't mind a curve ball every once in a while and you can be flexible in responsibilities.
- Cool with casual. A relaxed dress code means it's casual Friday, every day.

Got it? Okay, but what will you actually be doing?

- Receiving, picking, and random stowing of packages
- Put the pick-up in pickup point - check customers in at the Assisted Pickup Desk
- Lend a hand - assist customers and problem-solve scenarios such as missing and/or damaged packages
- You have it covered - open and close the store and cover leadership responsibilities
- Keep it clean - help maintain a clean and organized workspace
- Other duties as needed

Let's sweeten the deal...

- Competitive pay
- Biweekly pay schedule
- Flexible work scheduling, we work with your school schedule
- Employee discount
- Employee Assistance Program
- On-the-job training and skill development

---

Job details  930

📍 USA, MA, Cambridge

🏢 Fulfillment / Warehouse Associate

Share this job

[ f ] [ in ] [ ↗ ] [ ✉ ] [ 🔗 ]

Related jobs

Amazon Warehouse Fulfillment Associate
USA, OH, Columbus

Campus Associate Part-Time - WIS1
USA, WI, Madison

Seasonal Campus Associate Part Time - DEP1
USA, IL, Chicago

Seasonal Campus Associate Part Time - PUR1
USA, IN, West Lafayette

Campus Associate Part-Time - CIN1
USA, OH, Cincinnati

FIG. 10B

Jobiak

YOUR PROGRESS

87% COMPLETE

REQUIRED

- Company ⌄
- Job Title ⌄
- Location ⌃
  - Cambridge, Ma USA  93%
  - Columbus, OH USA  81%
  - Madison, WI USA  45%
  - Chicago, IL CA...  27%
  - West Lafayette, IN...  22%
- Description ⌄
- Date Posted ⌄
- Valid Through ⌄

OPTIONAL

- Employment Type ⌄
- Salary ⌄
- Job ID Number ⌄

910

---

Part - Time Campus Associate  920

Job ID: SF180014715 | Amazon Pickup Points LLC

[ Apply now ]

DESCRIPTION   940

*and apply today!*
**Stop reading about all those cool, *innovative companies* and JOIN ONE! Submit your resume**

It you want to work for a great company, take satisfaction in seeing the delighted smiles of customers and most importantly, want schedule flexibility while working on an exciting new service, then join us in making Amazon history! Amazon is launching a new way of getting customers the products they love right in your community. Help create an awesome experience that Amazon customers can't live without!

Help us bring the ease of ordering from Amazon even further - straight to the Boston - Central Square community! We are looking for students and leaders who are ready to delight our customers with rock star-quality service, have an up-for-anything attitude, and thrive in an ever-changing environment. Want to be a part of the smile on the box and bringing the next big thing to your community? Read on, apply, and submit your resume!

*Things you should know about working in an Amazon Campus Pickup Point:*

- Customer-obsession. It makes your day to make someone else happy.
- Quality is key. You have high standards and it shows in your work. We'll hold you to it, but only because we know our associates can handle it.
- Flexible like Gumby. You don't mind a curve ball every once in a while and you can be flexible in responsibilities
- Cool with casual. A relaxed dress code means it's casual Friday, every day.

*Got it? Okay, but what will you actually be doing?*

- Receiving, picking, and random stowing of packages
- Put the pick-up in pickup point - check customers in at the Assisted Pickup Desk
- Lend a hand - assist customers and problem-solve scenarios such as missing and/or damaged packages
- You have it covered - open and close the store and cover leadership responsibilities
- Keep it clean - help maintain a clean and organized workspace
- Other duties as needed

*Let's sweeten the deal...*

- Competitive pay
- Biweekly pay schedule
- Flexible work scheduling, we work with your school schedule
- Employee discount
- Employee Assistance Program
- On-the-job training and skill development

---

Job details   930

- 📍 USA, MA, Cambridge [LOCATION]
- 🏢 Fulfillment / Warehouse Associate

Share this job

[ f ] [ in ] [ 🔗 ] [ ✉ ] [ 🔗 ]

Related jobs

Amazon Warehouse Fulfillment Associate
USA, OH, Columbus

Campus Associate Part-Time - WIS1
USA, WI, Madison

Seasonal Campus Associate Part Time - DEP1
USA, IL, Chicago

Seasonal Campus Associate Part Time - PUR1
USA, IN, West Lafayette

Campus Associate Part-Time - CIN1
USA, OH, Cincinnati

FIG. 10C

Jobiak

YOUR PROGRESS

87% COMPLETE

REQUIRED
- Company
- Job Title
- Location
- Description (+)
- Date Posted
- Valid Through OPTIONAL
- Employment Type
- Salary
- Job ID Number

910

---

Part-Time Campus Associate 920

Job ID: SF180014715 | Amazon Pickup Points LLC

Apply now

DESCRIPTION (−) DESCRIPTION | *Stop reading about all those cool, innovative companies and JOIN ONE! Submit your resume and apply today!*

If you want to work for a great company, take satisfaction in seeing the delighted smiles of customers and most importantly, want schedule flexibility while working on an exciting new service, then join us in making Amazon history! Amazon is launching a new way of getting customers the products they love right in your community. Help create an awesome experience that Amazon customers can't live without!

(−) Help us bring the ease of ordering from Amazon even further - straight to the Boston - Central Square community! We are looking for students and leaders who are ready to delight our customers with rock star-quality service, have an up-for-anything attitude, and thrive in an ever-changing environment. Want to be a part of the smile on the box and bringing the next big thing to your community? Read on, apply, and submit your resume! DESCRIPTION

(+) *Things you should know about working in an Amazon Campus Pickup Point:*
- Customer-obsession. It makes your day to make someone else happy.
- Quality is key. You have high standards and it shows in your work. We'll hold you to it, but only because we know our associates can handle it.
- Flexible like Gumby. You don't mind a curve ball every once in a while and you can be flexible in responsibilities.
- Cool with casual. A relaxed dress code means it's casual Friday, every day.

(+) *Got it? Okay, but what will you actually be doing?*
- Receiving, picking, and random stowing of packages
- Put the pick-up in pickup point - check customers in at the Assisted Pickup Desk
- Lend a hand - assist customers and problem-solve scenarios such as missing and/or damaged packages
- You have it covered - open and close the store and cover leadership responsibilities
- Keep it clean - help maintain a clean and organized workspace
- Other duties as needed (+) *Let's sweeten the deal...*
- Competitive pay
- Biweekly pay schedule
- Flexible work scheduling, we work with your school schedule
- Employee discount
- Employee Assistance Program
- On-the-job training and skill development

940

---

Job details 930

⊙ USA, MA, Cambridge

🏢 Fulfillment / Warehouse Associate

Share this job

[f] [in] [↗] [✉] [🖶]

Related jobs

Amazon Warehouse Fulfillment Associate
USA, OH, Columbus

Campus Associate Part-Time - WIS1
USA, WI, Madison

Seasonal Campus Associate Part Time - DEP1
USA, IL, Chicago

Seasonal Campus Associate Part Time - PUR1
USA, IN, West Lafayette

Campus Associate Part-Time - CIN1
USA, OH, Cincinnati

FIG. 10D

Jobiak

YOUR PROGRESS

87%
COMPLETE

REQUIRED

- Company ⌄
- Job Title ⌄
- Location ⌄
- Description ⌄
- Date Posted ⌃

93%

July 22, 2018
Select a Date

| | | July 2018 | | | | |
|---|---|---|---|---|---|---|
| SUN | MON | TUE | WED | THU | FRI | SAT |
| 1 | 2 | 3 | 4 | 5 | 6 | 7 |
| 8 | 9 | 10 | 11 | 12 | 13 | 14 |
| 15 | 16 | 17 | 18 | 19 | 20 | 21 |
| 22 | 23 | 24 | 25 | 26 | 27 | 28 |
| 29 | 30 | 31 | | | | |

- Valid Through ⌄

OPTIONAL

- Employment Type ⌄
- Salary ⌄
- Job ID Number ⌄

910

---

Part-Time Campus Associate  920

Job ID: SF180014715 | Amazon Pickup Points LLC

Apply now

DESCRIPTION  940

*Stop reading about all those cool, innovative companies and JOIN ONE! Submit your resume and apply today!*

If you want to work for a great company, take satisfaction in seeing the delighted smiles of customers and most importantly, want schedule flexibility while working on an exciting new service, then join us in making Amazon history! Amazon is launching a new way of getting customers the products they love right in your community. Help create an awesome experience that Amazon customers can't live without!

Help us bring the ease of ordering from Amazon even further - straight to the Boston - Central Square community! We are looking for students and leaders who are ready to delight our customers with rock star-quality service, have an up-for-anything attitude, and thrive in an ever-changing environment. Want to be a part of the smile on the box and bringing the next big thing to your community? Read on, apply, and submit your resume!

*Things you should know about working in an Amazon Campus Pickup Point:*

- Customer-obsession. It makes your day to make someone else happy.
- Quality is key. You have high standards and it shows in your work. We'll hold you to it, but only because we know our associates can handle it.
- Flexible like Gumby. You don't mind a curve ball every once in a while and you can be flexible in responsibilities
- Cool with casual. A relaxed dress code means it's casual Friday, every day.

*Got it? Okay, but what will you actually be doing?*

- Receiving, picking, and random stowing of packages
- Put the pick-up in pickup point - check customers in at the Assisted Pickup Desk
- Lend a hand - assist customers and problem-solve scenarios such as missing and/or damaged packages
- You have it covered - open and close the store and cover leadership responsibilities
- Keep it clean - help maintain a clean and organized workspace
- Other duties as needed

*Let's sweeten the deal...*

- Competitive pay
- Biweekly pay schedule
- Flexible work scheduling, we work with your school schedule
- Employee discount
- Employee Assistance Program
- On-the-job training and skill development

---

Job details  930

📍 USA, MA, Cambridge

🏢 Fulfillment / Warehouse Associate

Share this job

[f] [in] [↻] [✉] [🔗]

Related jobs

Amazon Warehouse Fulfillment Associate
USA, OH, Columbus

Campus Associate Part-Time - WIS1
USA, WI, Madison

Seasonal Campus Associate Part Time - DEP1
USA, IL, Chicago

Seasonal Campus Associate Part Time - PUR1
USA, IN, West Lafayette

Campus Associate Part-Time - CIN1
USA, OH, Cincinnati

Jobiak

YOUR PROGRESS

87% COMPLETE

REQUIRED
- Company
- Job Title
- Location
- Description
- Date Posted
- Valid Through

OPTIONAL
- Employment Type
- Salary: $180,000 [Enter Salary | Enter]
- Job ID Number

TRACK LINKS
- Link 1
- Link 2
- Link 3
- Link 4
- Link 5

910

---

Part-Time Campus Associate  920

Job ID: SF180014715 | Amazon Pickup Points LLC

[Apply now]

DESCRIPTION  940

*Stop reading about all those cool, innovative companies and JOIN ONE! Submit your resume and apply today!*

If you want to work for a great company, take satisfaction in seeing the delighted smiles of customers and most importantly, want schedule flexibility while working on an exciting new service, then join us in making Amazon history! Amazon is launching a new way of getting customers the products they love right in your community. Help create an awesome experience that Amazon customers can't live without!

Help us bring the ease of ordering from Amazon even further - straight to the Boston - Central Square community! We are looking for students and leaders who are ready to delight our customers with rock star-quality service, have an up-for-anything attitude, and thrive in an ever-changing environment. Want to be a part of the smile on the box and bringing the next big thing to your community? Read on, apply, and submit your resume!

*Things you should know about working in an Amazon Campus Pickup Point:*

- Customer-obsession. It makes your day to make someone else happy.
- Quality is key. You have high standards and it shows in your work. We'll hold you to it, but only because we know our associates can handle it.
- Flexible like Gumby. You don't mind a curve ball every once in a while and you can be flexible in responsibilities.
- Cool with casual. A relaxed dress code means it's casual Friday, every day.

*Got it? Okay, but what will you actually be doing?*

- Receiving, picking, and random stowing of packages
- Put the pick-up in pickup point - check customers in at the Assisted Pickup Desk
- Lend a hand - assist customers and problem-solve scenarios such as missing and/or damaged packages
- You have it covered - open and close the store and cover leadership responsibilities
- Keep it clean - help maintain a clean and organized workspace
- Other duties as needed

*Let's sweeten the deal...*

- Competitive pay
- Biweekly pay schedule
- Flexible work scheduling, we work with your school schedule
- Employee discount
- Employee Assistance Program
- On-the-job training and skill development

---

Job details  930

- USA, MA, Cambridge
- Fulfillment / Warehouse Associate

Share this job
[f] [in] [↗] [✉] [🔗]

Related jobs

Amazon Warehouse Fulfillment Associate
USA, OH, Columbus

Campus Associate Part-Time - WIS1
USA, WI, Madison

Seasonal Campus Associate Part Time - DEP1
USA, IL, Chicago

Seasonal Campus Associate Part Time - PUR1
USA, IN, West Lafayette

Campus Associate Part-Time - CIN1
USA, OH, Cincinnati

FIG. 10G

AUTOMATIC TAGGING FOR ONLINE JOB LISTINGS

RELATED APPLICATIONS

None.

COPYRIGHT NOTICE

© 2018 JOBIAK LLC. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

BACKGROUND OF THE INVENTION

The internet has proven useful for employers to advertise job openings, and it has enabled users to search for job opening of interest to them. Employers may post job listings on their company websites, and/or post them on various "job board" websites. Some websites work to collect job listings into a single location for convenience of users but collecting the listings from disparate sources is problematic because of substantial variations in content, form and organization of the listings. These variations make it difficult to automate such processes. It would be beneficial to employers to make their job listings appear at selected sites on the internet in a manner that is automated, fast, accurate, efficient and inexpensive.

SUMMARY OF THE INVENTION

The following is a summary of the invention in order to provide a basic understanding of some aspects of the invention. This summary is not intended to identify key/critical elements of the invention or to delineate the scope of the invention. Its sole purpose is to present some concepts of the invention in a simplified form as a prelude to the more detailed description that is presented later.

In an example, an AI-based tagging platform is provided. The software platform is arranged to automatically recognize, extract and assemble job listing data from job listing sources such as employer sites or job listing documents. The platform is further arranged to tag or re-tag the job data in a selected manner called structured data so that is complies with the particular tagging requirements or schema of a selected website. In this way, the job listings may be imported automatically and correctly to the selected website.

The tagging platform utilizes machine learning techniques to generate predictive models, for example, classification models, to predict what portions of a job listing correspond to selected tags. These "tag predictions" may be assigned a confidence level or "prediction score" by the corresponding prediction model. In an embodiment, for a given tag, multiple alternative prediction values may be presented in a UI for a user to validate or correct them. In an embodiment, missing values may be flagged and presented on a UI for a user to provide them. After the structured data is completed, including all required field values, the structured data may be inserted into a user's web site for automatic recognition by a bot or similar autonomous process that searches for and collects job listings on the internet.

Additional aspects and advantages of this invention will be apparent from the following detailed description of preferred embodiments, which proceeds with reference to the accompanying drawings.

BRIEF DESCRIPTION OF THE DRAWINGS

FIGS. 9A-9B show an example of a tagging system user interface ("UI").

FIG. 10A illustrates Company tag review on the UI of FIGS. 9A-9B.

FIG. 10B illustrates job Title tag review on the UI of FIGS. 9A-9B.

FIG. 10C illustrates job Location tag review on the UI of FIGS. 9A-9B.

FIG. 10D illustrates job Description tag review on the UI of FIGS. 9A-9B.

FIG. 10E illustrates Date Posted tag review on the UI of FIGS. 9A-9B.

FIG. 10F illustrates Employment Type tag review on the UI of FIGS. 9A-9B.

FIG. 10G illustrates Salary tag review on the UI of FIGS. 9A-9B.

DETAILED DESCRIPTION OF PREFERRED EMBODIMENTS

Figure 1:
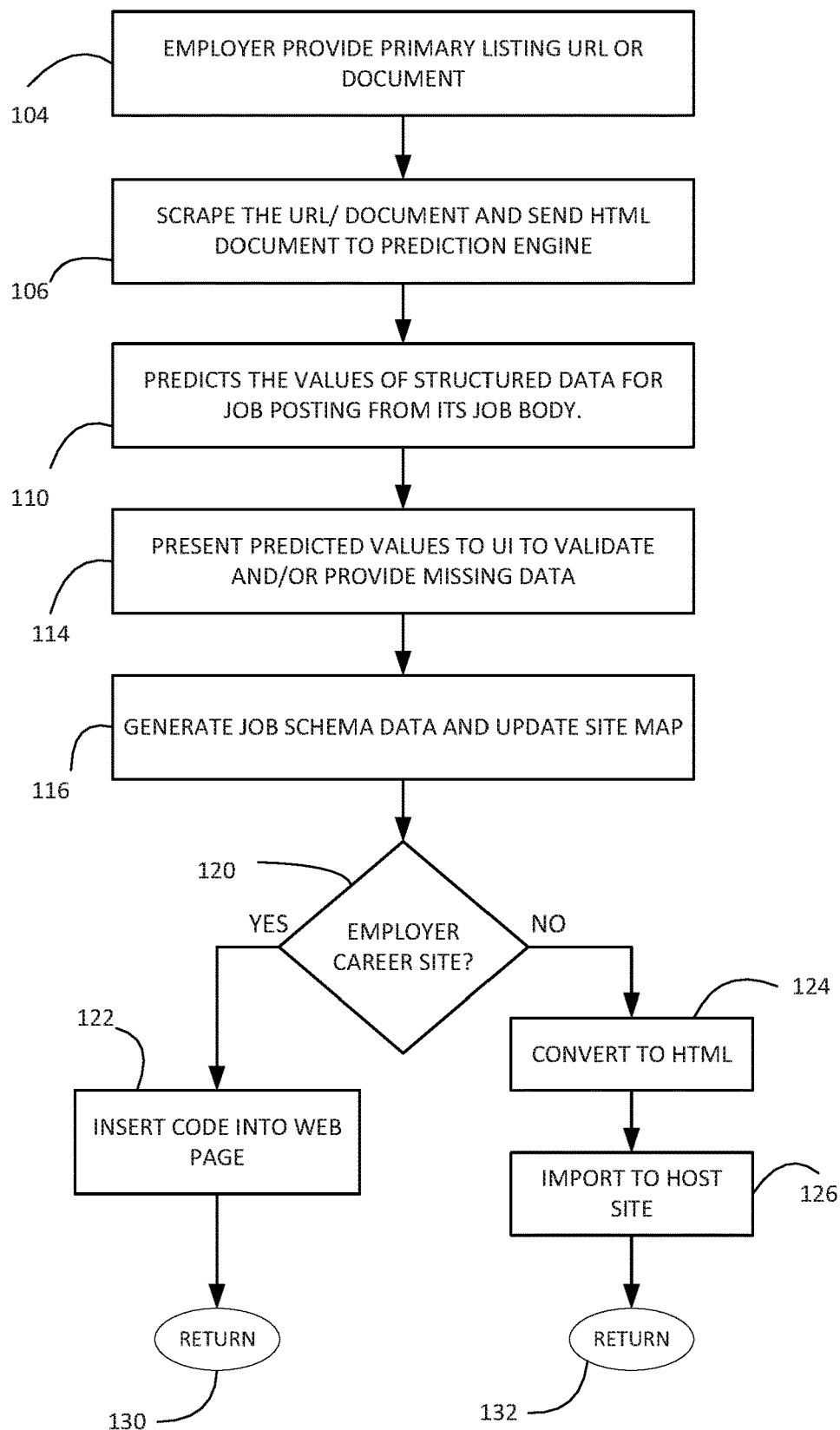
FIG. 1 is a simplified overview flow diagram of a process for automatically tagging a job listing.

FIG. 1 is a simplified flow diagram of a process for tagging a job listing; that is, to tag or re-tag the job data automatically so that it complies with a selected schema. For example, the schema may correspond to the HTML tagging requirements of a particular website, such as a job listing site. This enables the job listing to be identified and automatically imported on to the job web site, for example, by a bot or similar autonomous process that looks for job listings, and imports those that comply with the applicable data structure or schema.

In an embodiment, an employer or an agent of an employer, for example, may provide a job listing document, or a link to such a document, as an input at block 104. The job listing, here called the primary job listing, as first generated, likely includes various data such as job title, location, salary, etc. Some type of data may be missing. Data that is present may be organized or structured in various ways. It may not be structured, but instead appear as a single narrative. Because of wide variability in primary job listings, it is challenging to identify specific types of data in the listings in order to provide structured data consistent with a desired schema.

To be eligible to appear on the job search UI, the source code of a job posting must include a number of specific elements known as structured job schema data. These elements can be added by the employer, to job postings on the company's career site for example, or by a third party/partner, a job board for instance. While large firms and big employers can afford the technical efforts and resources (e.g., hiring web developer) in order to add structured data, this is not the case of small and medium-size companies (SMB). To have their jobs eligible to appear on Google for Jobs, for example, SMBs can either choose to address themselves the process of preparing jobs based on Google requirements or can decide to pay a job board or an agency in order to help in this process. In the former case, this becomes a laborious process for an SMB. In the latter case this increases the dependency of SMBs on job boards and agencies which are very costly; otherwise, their jobs will not appear on Google for jobs.

This application describes a solution that enables any employer wishing to publish job postings on Google job search platform or any other web site with minimal cost and time. This document discloses an end-to-end solution that takes care of adding structured data and sitemap to any job posting, to ensure that job postings will appear on a specified platform and frees employers from all the technical efforts. Referring again to FIG. 1, an employer provide a URL or a document where the job postings are located, block 104. The tagging process scrapes the document and sends a corresponding html document to a prediction engine (which may be called Tag Finder), block 106.

The Tag Finder engine predicts the values or labels of structured data for a job posting from its job body, block 110, as described in more detail below. A tagging user interface or "Tag UI" component displays the results on a UI, block 114, for potential additional interactions: employer validation, missing information, etc. One example Tag UI is described in detail below with regard to FIGS. 9A-9B and 10A-10E. In some embodiments, where all required tag values are predicted with a sufficiently high confidence level, say 90%, the structured data can be generated and inserted into a web page automatically, i.e., without human intervention. Next, the system generates the structured data compliant with the selected schema, and updates the web site map to reflect it, block 116.

Decision 120 determines whether the employer (job lister) has a career website or page where they list their own job openings. Employers with a career site or jobs web page may have the option to enter a small piece of JavaScript into their web pages, block 122, if they would like to re-direct applicants from a job search platform, for example, Google jobs, to the employer career site. In this way, the disclosed methods and systems can be used to predict tags for additional existing job openings and future jobs on the employer web site. This aspect of the process ends at return block 130.

If the employer does not have a career site or prefers not to add the code snippet, they will have the option of hosting jobs on an intermediary host site, which may be associated with the tagging platform. In this case, the job listing may be provided in a Word document, pdf file, or other formats. Essentially the same tagging platform (provisioned on the host site or coupled to it) will find the extract tag data from the submitted document, including at least the required tags for a selected job site or search site schema. The host will create a web page with the job listing, for example, using HTML and JSON, and make it publicly available. In that web page, the host will include or insert at least the required structured data in accordance with a selected site schema, for example, google jobs. In this application, applicants from Google jobs, for example, will first land on the intermediary site and then redirect to the employer career site. Here, the job listing is converted to html, block 124, and then imported to the intermediary site, block 126. The intermediary site may host these jobs and utilize the tagging processes disclosed herein to make the job listings appear on Google Jobs or any other platform that utilizes a published schema to collect and list job opportunities. This aspect of the process ends at return block 132.

Figure 2:
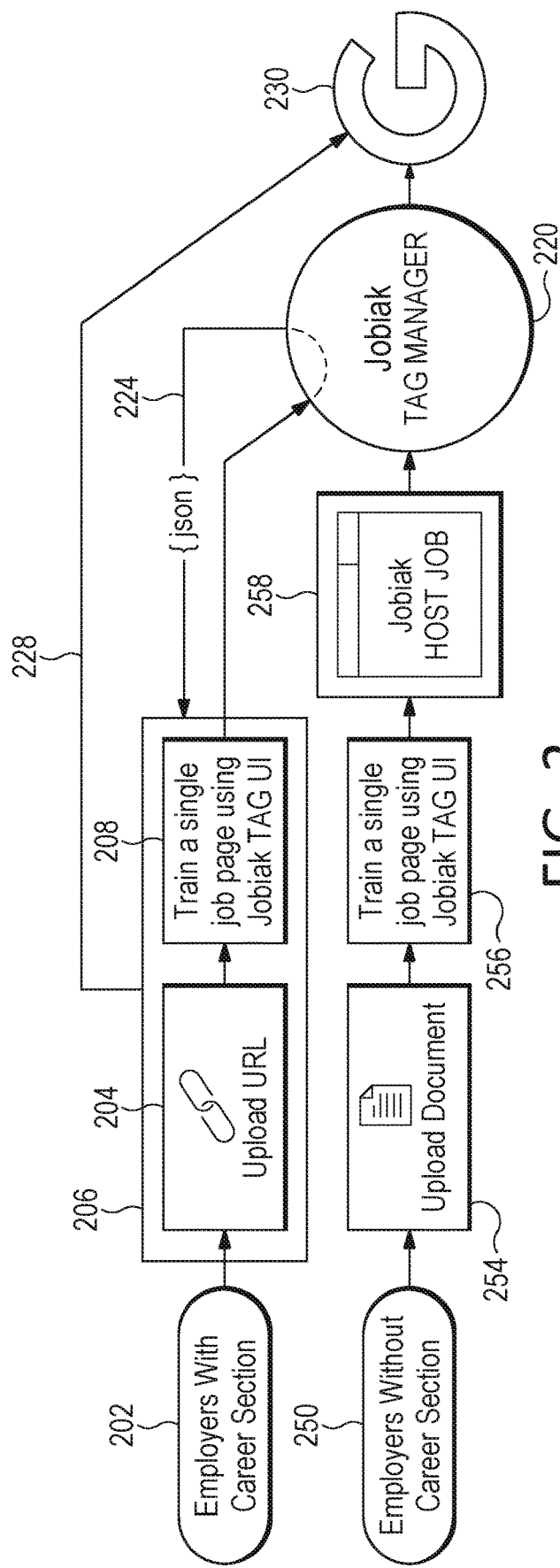
FIG. 2 is a high-level, simplified block diagram of an environment utilizing an automatic markup language tagging process generally of the type illustrated in FIG. 1 for online job listings.

FIG. 2, as mentioned, is a simplified block diagram of an environment utilizing an automatic markup language tagging process generally of the type illustrated in FIG. 1 for online job listings. In this illustration, employers 202 refers to employers who have a "career" section or page on their website or equivalent online presence. The name is not critical; it may say, for example, "jobs" or "openings" or "join our team" or "careers" etc. The point is an online location for posting job listings that can be reached by a URL or similar electronic address or link Preferably, one URL links to one job posting although this is not required.

Employers 202 may upload the URL, box 204 to an online service 206, for example, via the internet, although email and other communication means may be used. The URL could be provided via telephone, to an automated or attended location. The service 206 trains a single job page using a tag user interface (UI). Here, training a job page refers to amending the page, typically written in html, to include certain structure data, including particular tags, as detailed below. The service 206 modifies the original page (at the URL 204), so that is complies with a defined schema of structured data. The schema may be defined by a web site 230 ("G") that enables users to search for job listings.

To that end, the service 206 may include or communicate with a tag manager system 220. The tag manager system 220 includes software tools and components, described in more detail below, to generate the structured data based on data in the original document 204, and applying other resources including ML systems and models. In this process, the tag manager may utilize a tag UI 208 to enable a user (typically the employer 202) to review and revise tentative structured data results generated from the original job listing at 204. The user may confirm or revise particular tag labels or provide missing data to be added to the structured data. After the UI review, the job listing at URL 204 is amended to include the structured data, an any other special statements that may be required by the schema. Because the job listing now complies with the defined schema of site 230, bots or other automated processes may find and import the listing at URL 204, via path 228, into the site 230, where is easily searchable by the public via the internet.

Referring again to FIG. 2, ellipse 250 represents an employer who does not have a web site or other online presence where jobs are listed. The employer 250 may upload a job listing, see upload document block 254. The job posting may be submitted in any convenient document type, such as Word doc, pdf, etc. from which text can be extracted. A service may convert the job listing into a web page, for example, using html. The service may use a tag UI, block 256, for interacting with the employer to validate, revise or add data to the listing. The job listing web page is constructed to include the structured data according to the defined schema. The web page may be hosted by any host, here for illustration called "Jobiak." Because the job listing complies with the defined schema of site 230, bots or other automated processes may find and import the listing from the Jobiak host site, into the site 230, where is easily searchable by the public via the internet.

Figure 3:
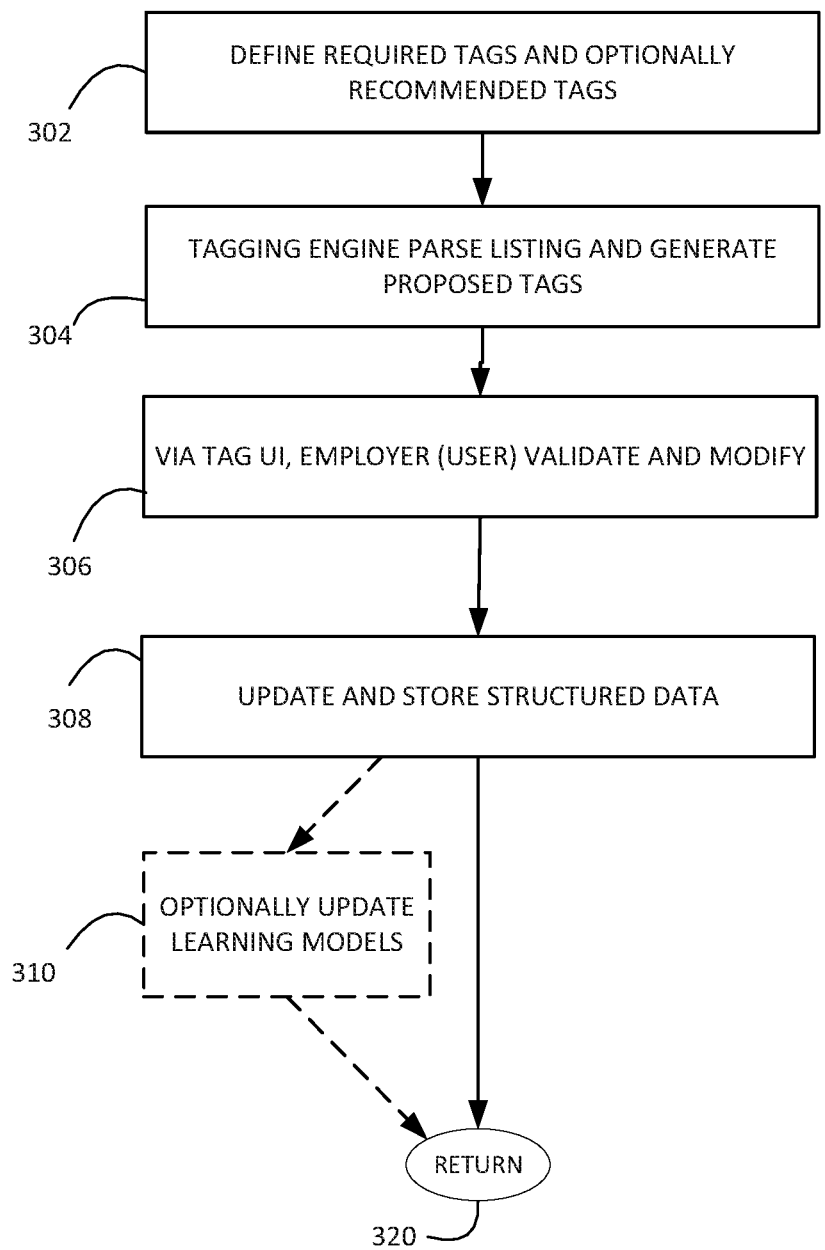
FIG. 3 is a simplified flow diagram of a process for parsing a job listing and updating machine learning models for predicting tags corresponding to data within a job post.

FIG. 3 is a simplified flow diagram of a process for parsing a job listing document. In an embodiment, this process may be carried out on a "tagging platform," for example, a server with suitable programming as described herein. At block 302, a set of tags are defined, generally by a schema. Some of the tags may be designated as required; and some of the tags may be designated as optional or recommended. Values must be provided for all required tags to complete a job listing. One of the features of the present disclosure is methods to automatically locate or identify data in a job body that corresponds to specific tags. Thus, a tagging engine parses the listing and generates proposed values or data for each tag, block 304. Preferably, the tagging engine is a software process executed in association with or on the tagging platform. In some embodiments, the proposed tags and values may be presented via a tag UI, block 306. Utilizing the UI, a user (for example, the employer or agent), may confirm or validate the proposed tags, modify the value selections, and/or provide missing tag data. An illustrative UI is shown and described with reference to FIGS. 9 and 10 below. After validation, the process updates and stores the validated, structured data, block 308. In some embodiments, changes to the proposed tag values that are made on the UI may be used to update or modify the prediction model(s) used to predict the affected tags, block 310. This "feedback loop" may be used to continually improve the quality of the ML models. This aspect of the process ends at return block 320.

EXTRACTING TAG VALUES

In an embodiment, the structured data may be divided into two or more categories of tags, for example: Required Tags and Recommended Tags. Required tags are those that must have values present in a listing to be eligible for induction into a site or web page that defines them as required in the applicable markup schema. Different sites or venues may have different required tags. Here, for illustration and not by way of limitation, are the required tags for job listings to appear on Google search. See https://developers.google.com/search/docs/data-types/job-posting#definitions. Context and Type tags are simply set to defined values to identify a job listing; they do not vary with different listings.

Figure 4:
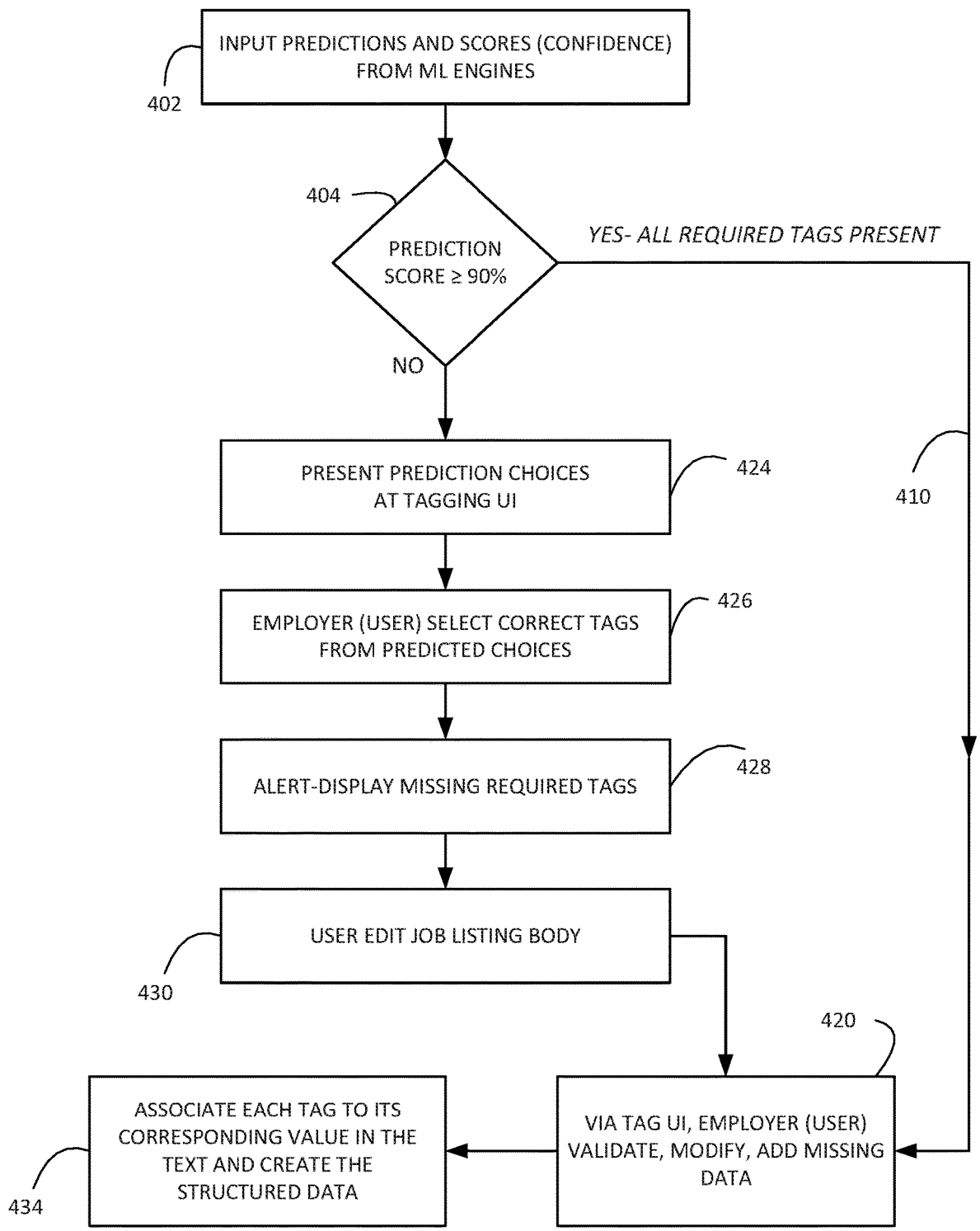
FIG. 4 is a simplified flow diagram of a process for processing tag predictions and associating one or more tags to their corresponding values to create structured data.

Example Required Tags
Context
Type
DatePosted
Description
HiringOrganization (Company)
Location
Title
ValidThrough
Example Recommended Tags
BaseSalary
EmploymentType
Identifier FIG. 4 is a simplified flow diagram of an example process for processing tag predictions and associating one or more tags to their corresponding values or "labels" to create structured data. In the drawing, tag predictions are received from one or more machine learning (ML) tagging engines, along with a corresponding tag score or confidence, block 402. The tagging engines may be provisioned on a tagging platform, or in communication with it. In various embodiments, some aspects of a tagging system may be implemented locally, while others are operable "in the cloud." Decision 404 determines whether all the REQUIRED tags are present; that is, they have been predicted, each tag prediction has a corresponding prediction score (or confidence) of at least 90%. For the predictions that do not meet this test (or a similar predetermined threshold value; exactly 90% is not a critical value), then the process continues at block 424 to present prediction choices at the tagging UI.

Interacting with the UI, a user (employer) may select or indicate the correct tag data from predicted choices. If no data could be found by the tagging engine for a required tag, the user may be requested to provide it via the UI, see alert 428. If multiple pieces of data were identified by the tagging engine for a given tag, they may be presented at the UI, and the user may select which of them is the correct data, block 426.

All of the required tags (at least) must be repeated in the structured data, in the defined HTML or JSON format, even if the same content already appears in the original or "unstructured" job listing. In the structured data, context and type tags are simply set to defined values. datePosted is simply the original date that employer posted the job, for example, in ISO 8601 format. The required tag description is more challenging to discern due to wide variations in style and content of job listings.

The user may edit the job listing body, block 430, via the tagging UI. This can be helpful because the user can now see the listing in structured form. In general, via the tagging UI, the user (employer) may validate (or approve) the tag data presented, modify or edit it, and add missing data, or any combination thereof, block 420. Finally, at block 434, each tag is associated to the correct corresponding value and the structured data is thus completed, block 434. The completed structured data may be inserted into the employer's web page or job listing. The UI may present an option to then post the modified listing or page to the internet.

Referring again to decision 404, if the decision is YES, all required tags are present with at least 90% (or another threshold value) prediction score, then the process proceeds via path 410 to the employer review via the UI, block 420, and thence to block 434 as before. In some embodiments, after some experience with a few job listings from the same employer, the system can run automatically to capture a new listing by the employer, process it to form the necessary structured data, insert the structured data into the job listing. This will expose the listing to a huge potential audience in mere seconds.

Figure 5:
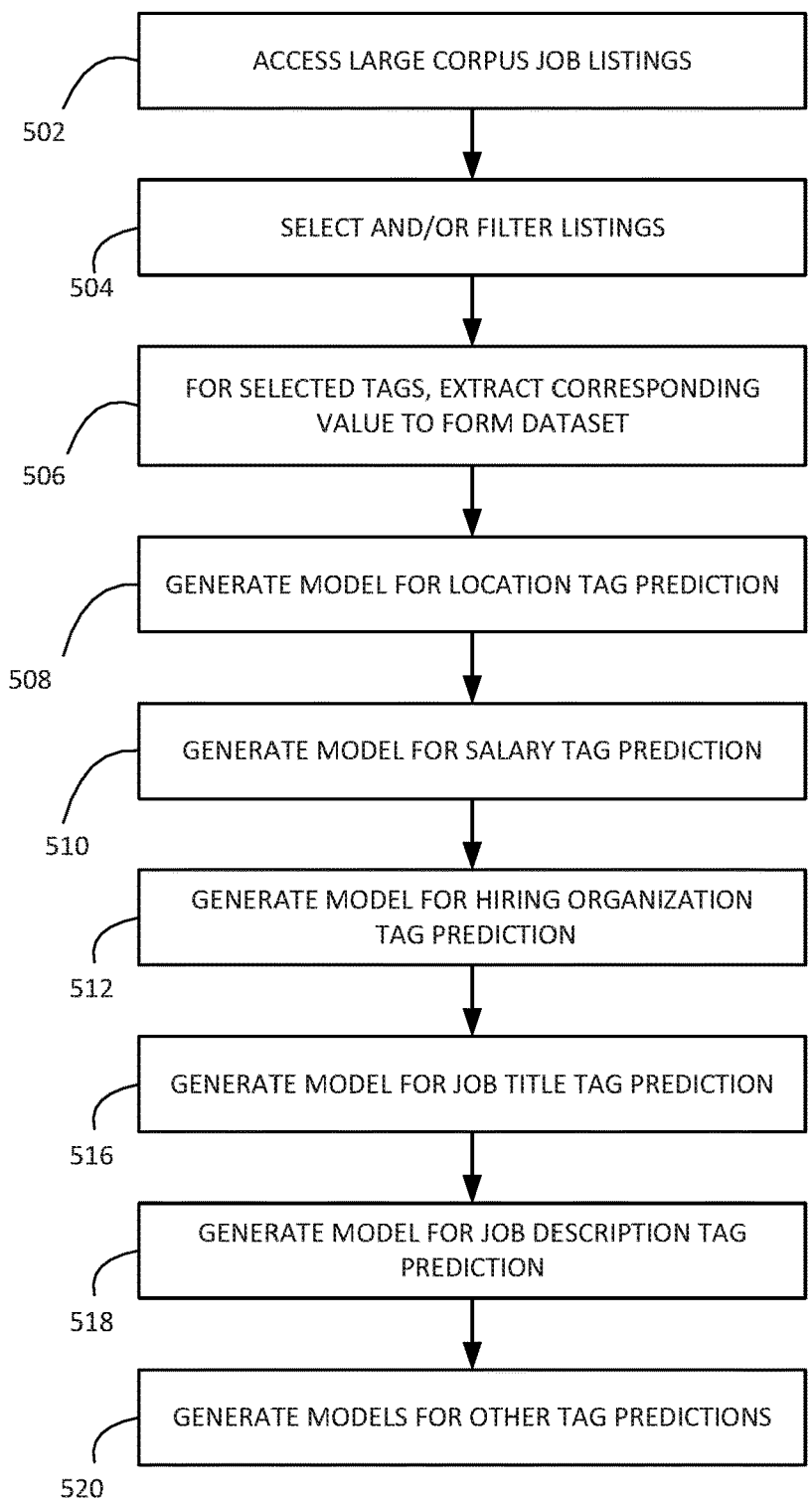
FIG. 5 is a simplified flow diagram of a process for creating individual job listing tag prediction models.

FIG. 5 is a simplified flow diagram of a process for creating individual tag prediction models. In a preferred embodiment, the tagging platform comprises advanced Machine Learning algorithms and use of XML Path Language (Xpath). Machine learning is a sub-field of Artificial Intelligence. It allows computers to build prediction models from complex data. It includes a wide range of algorithms that are grouped under 3 main groups: 1) Supervised algorithms, 2) Unsupervised algorithms, and 3) Reinforcement learning. In order to use machine learning, algorithms need to have good quality training data in order to make robust predictions. In the context of machine learning, different tags might have different prediction models. Tags that share similar prediction reasoning may be grouped together as described below.

In some embodiments, the tagging platform may use machine learning and Xpath interchangeably or in tandem to ensure that all required values are correctly predicted. This is not to say that only a single model is ideal for a given job tag. To the contrary, multiple models, clusters, lookup tables and other means may be employed for some tags. In FIG. 5, this example algorithm begins with accessing a large corpus of job listings. Examples of such data sets may be found on various job listing web sites or "job boards," block 502. Known technologies can be used to download such data, or it can be obtained or licensed from the proprietor in machine-readable form.

The corpus of listings may be filtered or otherwise selected to form a desired subset of the data, block 504. For example, it may be desirable to filter job listings based on location for present purposes. In one preferred embodiment, the corpus may be filtered so as to limit or cap the number of listings included from the same source or employer. This makes the resulting data set more random in the sense of limiting the influence of a single employer.

At block 506, the process calls for extracting corresponding data values for selected tags from the dataset created by step 504. For example, for a location tag, this step may extract the [city, state] data from each record in the dataset. We describe below automated processes to find location and other tag data within a job listing body. The extracted data is then used as a training dataset. Block 508 next calls for generating a machine learning model for tag prediction based on the training dataset. In more detail, one or more different models may be created for a given tag. The examples shown are in English, however, the processes described herein may be applied to other languages. The ML models described may be used for non-English languages, provided that training dataset(s) are provided in the desired language.

To illustrate, step 508 calls for generating a model for location tag prediction. Step 510 calls for generating a model for salary tag prediction. Step 512 calls for generating a model for hiring organization tag prediction. Step 516 calls for generating a model for job title tag prediction. Step 518 calls for generating a model for job description tag prediction. And finally, other models may be generated for other tag predictions, block 520. The steps are described in more detail below. In one example, the starting corpus may include on the order of one million job listings. After selection and filtering, a reduced training dataset is used for ML model building.

In some embodiments, a tag prediction model may be formed by supervised learning, for example. In supervised learning, say for a location tag model, the location value for at least some of the listings in the dataset is known. Given those "answers," the model learns how to predict location for another instance (listing) in which location is not known.

In general, regular expressions may be used to find strings having certain patterns. They are used to extract tag-specific patterns by looking at tag values extracted from a large dataset such as the one mentioned above. Below we provide more information about this process. A given tag might have multiple pattern extraction rules. In addition, tags that share a similar process may be grouped together.

Location Tag Prediction

Figure 6:
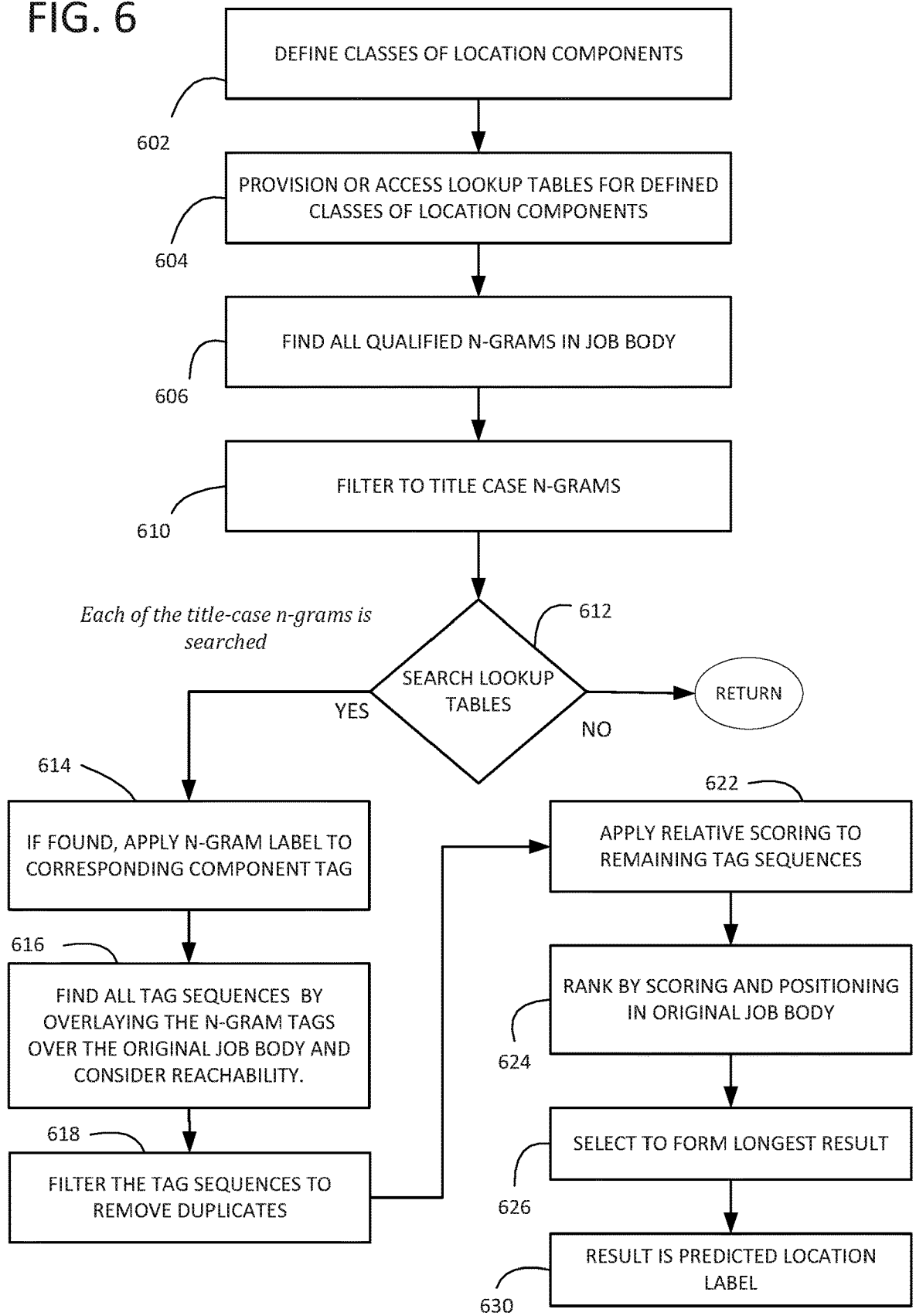
FIG. 6 is a simplified flow diagram of a process for generating tag predictions for a location tag.

FIG. 6 is a simplified flow diagram of a process or algorithm for generating tag predictions for a location tag. At block 602, the process begins by accessing or defining classes of location elements or components. In one embodiment, there may be four classes of location components:
1. Cities
2. States (or equivalent in non-US countries, e.g. Provinces in Canada)
3. Regions (e.g. "New England", "Bay Area")
4. Countries At block 604, the process entails provisioning or accessing lookup tables for defined classes of location components. For cities and regions, there may be one or more corresponding lookup table(s). For each of states and countries, a preferred embodiment may utilize two lookup tables, one with the full names and one with the standard abbreviations for states and countries. For example, the standard USPS two-letter state codes may be used. The ANSI standard two-letter country codes may be used. Other lookup tables may be used for these and other location tag components.

Next, at block 606, the process locates all qualified n-grams in the listing job body. For example, where n is between 1 and the maximum number of tokens among all of the lookup tables and the overall length of the n-grams are less than or equal to the maximum length among all the lookup tables. These n-grams are then filtered, block 610, to include only those that have "title case," meaning each word in the n-gram is capitalized, with the exception of interior prepositions such as the word "of."

Each of the title case n-grams is used to search for a match in the lookup tables, decision 612. If a match is found (YES), it receives the corresponding tag, one of "city", "state", "region" and/or "country," block 614. That is, for a matching lookup table entry, associating the matching n-gram as a label corresponding to the location component associated with the lookup table where the matching entry was found.

A single n-gram may receive more than one tag (for example "New York" is both a city and a state). A single token may be shared among multiple n-grams (for example "York" is contained in the bi-gram, "New York", as well as the unigram "York" and both of those n-grams will receive the "city" tag.

Next, the process calls for finding all tag sequences with maximum length four by overlaying the n-gram tags over the original job body and considering the "reachability" of one tag to the next, block 616. (A single tag can be part of multiple tag sequences.) Tag B is reachable from tag A if it is only separated by punctuation and/or a small preposition. Hence in the sentence "Apple seeks programmer in Paris, France", ["Paris", "France"] would be a sequence of type ["city", "country"]. The process would also find the shorter sequences ["Paris"] and ["France"] of types ["City"] and ["Country"], respectively. Conversely, in the sentence "Apple France seeks programmer for Paris office" would only find the single term sequences since "Paris" is not "reachable" from "France." In this process, an n-gram with multiple tags will always be part of multiple sequences. For example, just the fragment "New York, N.Y." will generate the tag sequences ["New York", "NY"] of type ["city", "state"], ["New York", "NY"] of type ["state", "state"], and ["York", "New York"], again of type ["city", "state"].

Block 618, the process filters the tag sequences to remove any with repeating tags. For example, the fragment "with offices in Los Angeles, San Francisco, and Stockholm" would generate a tag sequence ["Los Angeles", "San Francisco"] of type ["city", "city"], but this would be discarded because it contains duplicate "city" tags.

In one embodiment, other tag sequences may be scored utilizing relative scoring (scaled 0 to 1.00) as shown in the following table (block 622). These reflect the relative likelihood of the sequences. This likelihood may be estimated, for example, based on a training dataset such as described above. The tag sequences may be ranked using the following illustrative scoring:

["city" "state" "region" "country"] 0.95
["country" "region" "state" "city"] 0.92
["city" "state" "country"] 0.90
["city" "region" "country"] 0.90
["city" "region" "state" "country"] 0.90
["country" "state" "region" "city"] 0.90
["country" "state" "city"] 0.85
["country" "region" "city"] 0.85
["city" "state"] 0.85
["city" "region"] 0.82
["city" "country"] 0.82
["state" "country"] 0.80
["state" "region"] 0.80
["region" "country"] 0.78
["state" "city"] 0.75
["region" "city"] 0.75
["country" "city"] 0.75
["state"] 0.75
["region"] 0.75
["country"] 0.75
["city"] 0.70
Any other sequence: 0.65

At block 624, if more than one sequence shares the maximum score among all the sequences, the algorithm selects the sequence that occurs earlier in the original job body. For example, the fragment "Los Angeles, Calif." contains two sequences of type ["city", "state"], one being ["Los Angeles", "CA"] and the other being ["Angeles", "CA"]. The former is chosen as it occurs earlier within the original test.

At block 626, where more than one sequence shares both the maximum score and the earliest position, the algorithm selects the one whose combined terms form the longest result. For example, if two sequences, both of type ["city"] were the highest scoring and occurred at the same position within the job body, the software would select "Saratoga Springs" over "Saratoga". At this point, there should only be one sequence remaining, and hence it is used as the predicted location label, block 630.

Salary Tag Prediction

In one illustrative embodiment, a process to find the salary in a job listing may consider four classes of salary designation, for example:

Periodic salary: A periodic salary includes an amount or a range of amounts together with a period of time. For example, "$100 per day" or "85K/year".

Range salary: A range salary consists of two amounts presented as a minimum and maximum, e.g., "USD 100,000-200,000".

Simple salary: A simple salary is a single amount, for example, "$45,850".

Descriptive salary: A descriptive salary is a textual description such as "competitive", "depends on experience", or "negotiable".

In one embodiment, a process may apply a scoring table such as the following:

"periodic" 0.85
"range" 0.80
"simple" 0.75
"descriptive" 0.70

Using such a scoring, the process may search for the highest scoring salary fragment in the job body text using regular expressions corresponding to each of the salary classes. In some embodiments, for certain classes, additional criteria must be satisfied to be eligible to be returned as the predicted label. In one example process:

Periodic: No additional criteria

Range: A range salary is only eligible if one of the following key words appears in the job body text within say, the 20 characters preceding the amount: "pay", "rate", "salary", "wage", "compensation".

Simple: A simple salary is only eligible if one of the following key words appears in the job body text within say, the 20 characters preceding the amount: "pay", "rate", "salary", "wage", "compensation", AND a currency symbol or code ($, USD, . . . ) also appears with the amount.

Descriptive: A descriptive salary is only eligible if one of the following key words appears in the job body text within say, the 20 characters preceding OR the 10 characters following the amount: "pay", "rate", "salary", "wage", "compensation".

In these examples, the 20-character distance is not critical; rather, a selected distance on the order of 20 characters may be used. The selected distance may be tuned empirically or by statistical analysis, for example, using a suitable dataset. The 20-character distance is a useful default or starting value. Preferably, where there is more than one eligible salary with the highest score, the process selects the one occurring earliest in the job body text as the predicted salary.

Hiring Organization Tag Prediction

To find the hiring organization, or company name, a preferred algorithm first examines the job body text to see if the company is presented explicitly. Examples of explicit presentation include fragments such as "Company name: Microsoft" or "Microsoft is an equal opportunity employer." If an explicit presentation is found, it is returned as the predicted company label.

If no explicit presentation is found, a preferred process relies on a pre-trained machine learning model, specifically a random decision forest. The model tries to predict whether a given candidate is the hiring organization as presented within the context of its job body text, or not.

The features used by the model, aside from the candidate itself, may include its position within the job body, its length, its number of occurrences within the job body, the words that precede it, the words that follow it, whether it occurs in a list of known world-wide company names, whether its "cleaned" version occurs as a cleaned version of the aforementioned list of company names (clean versions ignore case, spacing and punctuation), and finally whether it occurs in a list of frequently occurring English words.

To find the company using the model, the process finds all n-grams in the job body, where n is between 1 and the maximum number of tokens among all of the known company names and the overall length of the n-grams are less than or equal to the maximum length among all known company names. These n-grams are then filtered to include only those that have "title case," meaning each word in the n-gram is capitalized with the exception of interior prepositions such as "of".

For each of the filtered candidates, the process calculates the features described above, and passes the information to the ML model, which returns "1" or "0" as its prediction of whether the candidate is or is not, respectively, the hiring organization corresponding to what should be the company label for that job body. With each prediction, the ML model also returns a confidence value between 0.0 and 1.0. For all candidates for which a "1" was returned, the process identifies the one with the highest confidence value and returns that candidate as the predicted company label.

Job Title Tag Prediction

An example algorithm for predicting the job title label preferably first searches the job body for non-relevant sections that refer to other job offerings and remove them if found. These are sections with titles such as "Similar Jobs" or "More Jobs". When referring to the "job body", in this section, we mean the cleaned job body text without these extraneous sections.

To find the job title, then, the algorithm may first examine the job body text to see if the title is presented explicitly. Example of explicit presentation include fragments such as "Job title: Senior Web Developer" or "Position: Controller". If an explicit presentation is found, it is checked against some negative indications such as "Full" or "Part", indicating that it may not be a presentation of the job title. If no negative indications are found, the explicit presentation is returned as the predicted job title label.

If no explicit presentation is found, the algorithm may consider distinct components of job titles, such as the following examples:

Basic title: The basic title is the part most descriptive of what the job entails, such as "Developer", "Nurse", "Accountant"

Level prefix: A level prefix comes before the basic title and indicates a level within the organization such as "lead", "assistant", "senior", "chief".

Skill prefix: A skill prefix comes before the basic title and indicates a specialization such as "C++", "Blockchain", "Pediatric".

Level suffix: A level suffix comes after the basic title and can indicate a grading within the position such as "intern", "I", "II". Note that some level prefixes may also be level suffixes. Example job titles that make use of one or more of the elements above would be "Senior Blockchain Developer", "Pediatric Nurse", "Public Relations Intern", "Software Developer IV", "Assistant Plumber".

The first step in finding a non-explicit job title, in the preferred algorithm, is to find all n-grams in the job body, where n is between 1 and the maximum number of tokens among a large list of all known job titles and the overall length of the n-grams are less than or equal to the maximum length among all known job titles. These n-grams are then filtered to include only those that have "title case", meaning each word in the n-gram is capitalized with the exception of interior prepositions such as the word "of." These candidates may be further filtered by including only those that are found in a list or lookup table of known job titles. The remaining candidates may be expanded by including any preceding level and/or skill prefixes and/or following level suffixes. If more than one candidate remains, precedence goes to the one occurring earliest within the job body text. The selected candidate is then returned as the predicted job title [label] for the listing.

Machine Learning Pipeline

Job Description is another challenging tag to predict. It delimits the core section where the job is described. It is common to have low-quality job bodies, sponsored or organic ads, or links to other jobs within the job body. A presently preferred embodiment is composed of a three-layer machine learning process to detect the section of the job description. It is a "bottom-up" approach that starts at a word-level, then operates at a sentence level, and finally gets applied on a paragraph level (set of sentences).

Predicting the job description region of a job body includes both a training phase and a prediction phase. First, given a corpus of job bodies with known job descriptions, a probabilistic topic model may be trained to discover the abstract topics occurring in the job bodies. In one implementation, the process may be based on Latent Dirichlet Allocation (LDA). Next, the job bodies are tokenized into sentences, and a random decision forest is trained to predict whether each sentence is part of the job description. The input features for each sentence were the topic distribution predicted by the topic model, combined with a range of structural features, such as sentence size and position with the job body. During the prediction phase, for novel job bodies, simple decision rules were used to predict the job description region based on the sentence-level predictions from the model. The following sections provide more detail with reference to FIG. 8 of the drawing.

1. Topic Modeling:

The first phase is a topic modeling algorithm trained on a large dataset such as the one million job dataset mentioned above. See corpus and training, FIG. 8, block 802. The goal is to analyze and model the different topics that are part of the training dataset, block 804. Various topic modeling algorithms are known, the Latent Dirichlet Allocation (LDA) algorithm is one example.

LDA is a statistical model that aims at discovering the underlying topics in a collection of documents. In the context of LDA, a topic consists of a probability distribution over words of a fixed vocabulary. For instance, a job body contains different sections and different topics such as company descriptions, work environment descriptions, salaries and perks section, etc. If a section is about job descriptions, then we could expect the words which appear the most frequently in this job descriptions topic to occur a lot in this section.

The LDA model takes two main inputs which are a corpus and a selected number of topics. A pre-processing preferably is conducted on the training dataset (the corpus) in order to reduce noise and improve data quality. As for the number of topics, it may be set, for example, to 48 topics. This figure has been shown to be useful, but it is not critical.

Figure 8:
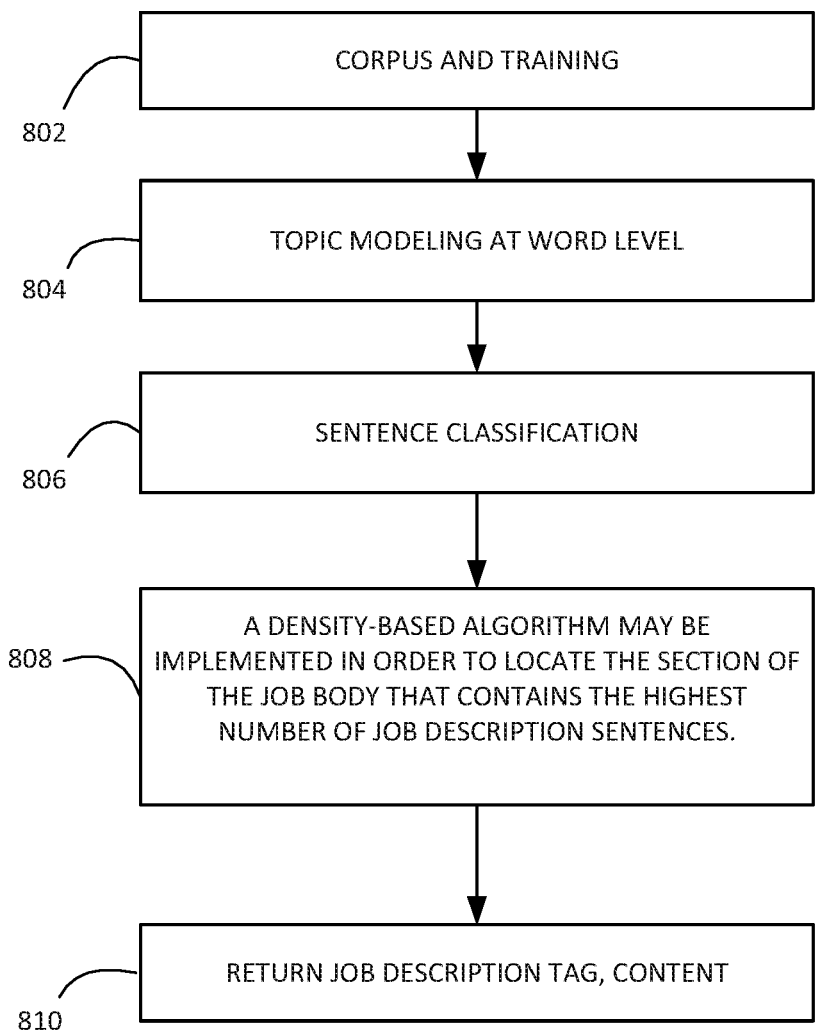
FIG. 8 is a simplified flow diagram of a machine learning process for finding job description data in a job listing.

2. Sentence Classification:

The goal of a sentence classifier is to identify sentences that describe or refer to the vocabulary of a job description. FIG. 8, block 806. In one embodiment, a classifier may be a binary classifier that is based on the included/excluded logic. Included sentences are job description sentences. The idea of a sentence-based classifier comes from the fact that LDA operates at a word-level. It is able to assign one or more topics to a given word. In addition, LDA might return more than one topic that describes or is related to a job description. It is the union of the vocabulary of all these topics that form the training set of the classifier. In other words, the vocabulary of the included class. The vocabulary that comes from the remaining topics refers excluded class. There are many classification algorithms in the area of supervised machine learning. In a preferred embodiment, the random forest algorithm is used.

3. Job Description Detector:

At this level, job body sentences are classified as part of the job description (included) or not (excluded). There may be some sentences with a vocabulary that represent a job description but are isolated from one another (at the top or bottom of the job body, for example). These sentences could may be misleading because they describe the job but aren't part of the main job description. To alleviate this problem, a density-based algorithm may be implemented in order to locate the section of the job body that contains the highest number of job description sentences, block 808. This section then is identified as the job description label and returned, block 810 in the drawing.

Figure 7:
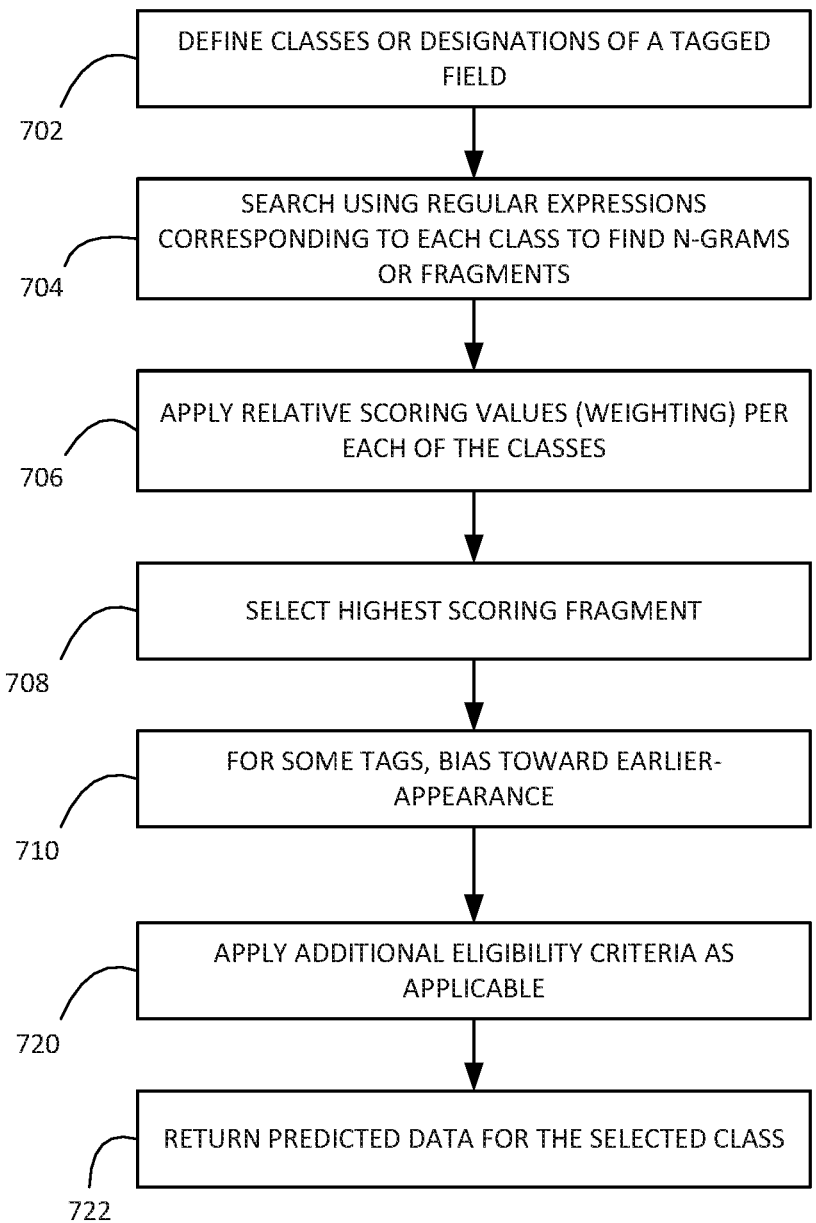
FIG. 7 is a simplified flow diagram of a general process for finding tag data in a job listing.

FIG. 7 is a simplified flow diagram of a generalized process for finding tag data in a job listing. At block 702, the algorithm calls for defining classes or designations of a tag. Some examples are given above. At block 704, the algorithm searches the job body using regular expressions corresponding to each defined class to find n-grams or fragments. Next, a selected relative scoring may be applied to each of the classes, block 706. The process selects the highest scoring fragment as a candidate label, block 708. In some cases, equal-scoring fragments may be resolved by biasing toward earlier appearance in the job body, block 710. Additional eligibility criteria may be applied depending on the specific tag block 720. Finally, the process returns the predicted data or label for the selected class of the tag.

FIG. 9A and FIG. 9B together illustrate an example user interface (UI) or "Tag UI" that may be realized, for example, as a web page. This interface enables a user (typically employer) to review, validate and optionally revise structured data generated by the tagging system. In FIG. 9A, the left side panel 910 of the display shows a summary of the "tagging" or generating structured tag data for the job listing. Here, the required tags are listed (Company, Job Title, Location, Description, Date Posted and Valid Through) followed by the optional tags (Employment Type, Salary, and Job ID Number). The specific tags may vary depending on the applied jobs schema; those listed here are merely illustrative.

In the center section, a top panel 920 shows the predicted job title, ID and employer as further explained below. The main center section 940 shows the job body text, and the right side panel 930 presents some additional job details and optionally related job listings, etc. In FIG. 9B, the bottom region 932 of the page has a reminder to finish defining required tags and an option to post the page to a selected web site, here Google by way of example.

Figure 10A:
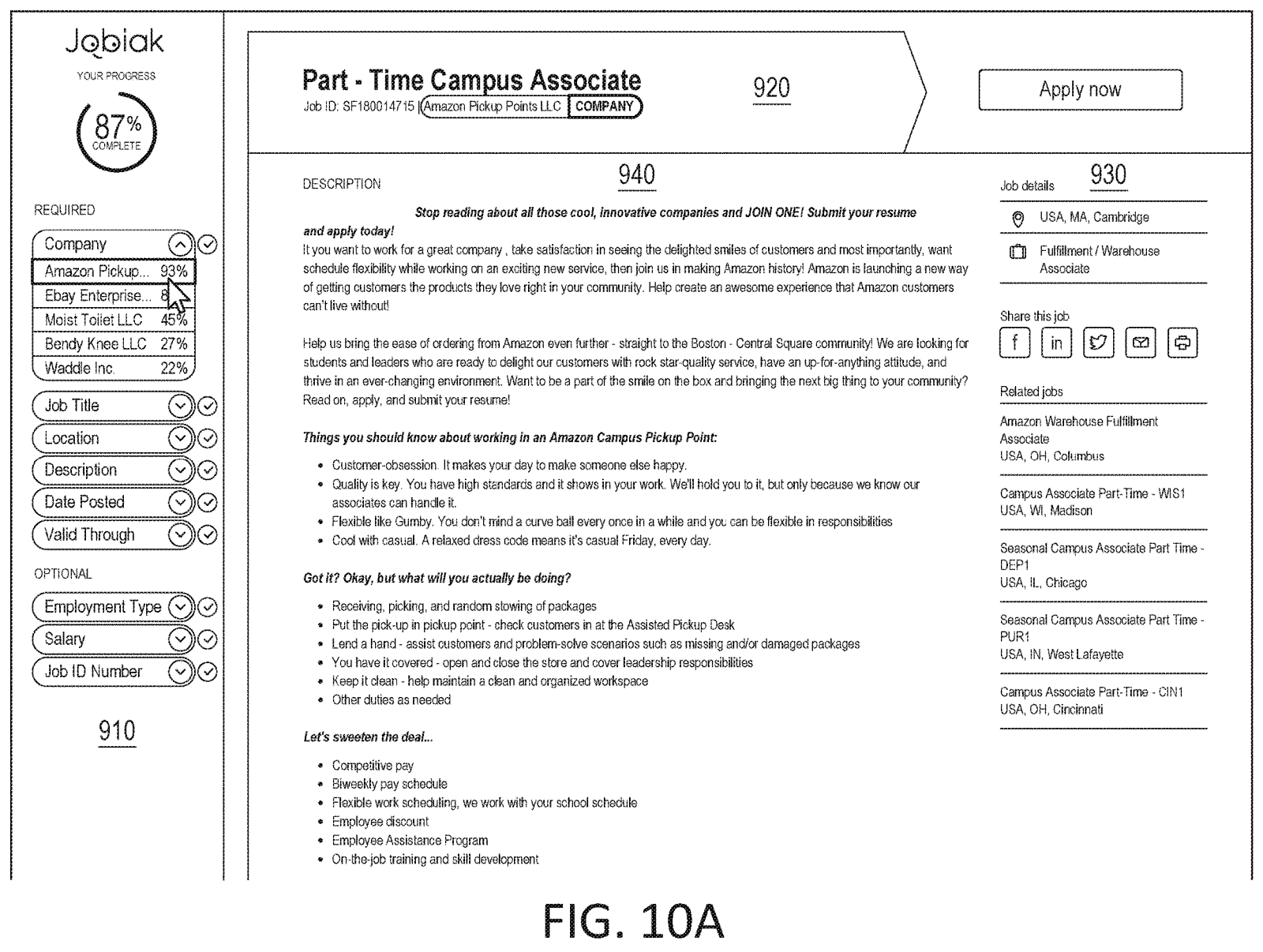

FIG. 10A illustrates Company tag review on the UI of FIGS. 9A-9B. Here, the user selects (clicks) the Company tag, in response to which a dropdown displays a series of alternative labels, with each one showing the corresponding prediction score or confidence metric returned by the ML prediction engine that generated the alternatives. The Company name Amazon Pickup . . . has a 93% score. The company name Ebay Enterprises has a score of 86%, and so on. In one embodiment, a threshold score may be 90%. When the user selects company name for review, the center top panel 920 highlights the top scoring company name Amazon Pickup Points LLC and highlights with bold the tag name "COMPANY." The user clicks a label among the listed options (here Amazon Pickup . . . ) to validate it as the correct company name for the listing. The system then uses the correct selection to validate or update the structured data for the listing.

FIG. 10B illustrates job Title tag review on the UI of FIGS. 9A-9B. Here, the user selects (clicks) the Job Title tag, in response to which a dropdown displays a series of alternative labels, with each one showing the corresponding prediction score or confidence metric returned by the ML prediction engine. The job title Campus Associate has a 93% score. The job title Campus RA has a score of 86%, etc. In one embodiment, a threshold score may be 90%. When the user selects job title for review, the center top panel 920 highlights the top scoring job title Part-time Campus Associate and highlights with bold the tag name "JOB TITLE." The user clicks a label among the listed alternatives to validate it as the correct job title. The system then uses the correct selection to validate or update the structured data for the listing.

FIG. 10C illustrates job Location tag review on the UI of FIGS. 9A-9B. Here, the user selects (clicks) the Location tag in the left panel 910, in response to which a dropdown displays a series of alternative labels, with each one showing the corresponding prediction score or confidence metric returned by the ML prediction engine. The location Cambridge, Ma USA has a 93% score. The location Columbus, Ohio has a score of eighty-something etc. In one embodiment, a threshold score may be 90%. When the user selects location for review, the right side panel 920 highlights the top scoring location, shown as USA, MA, Cambridge, and highlights with bold the tag name "LOCATION." The user clicks a label among the listed alternatives to validate it as the correct location. The system then uses the selection to validate or update the structured data for the listing.

FIG. 10D illustrates job Description tag review on the UI of FIGS. 9A-9B. In this example, the user selects (clicks) the Description tag in the left panel 910, in response to which the center panel 940 display changes to show multiple sections of text, each of which has a circular button adjacent, to enable the user to add (+) or remove (−) the corresponding section to or from the description tag label by clicking the corresponding button. These sections are those predicted by the ML tagging engine as potentially being part of the job description, listed in descending order of the respective prediction scores (confidence). Here, the top two sections are included as they have prediction scores at least equal to a predetermined threshold value, say 90%. The tag DESCRIPTION is highlighted next to those sections, and the minus (−) button is provided to enable the user to optionally remove each section from the description tag label. The user can optionally add any or all of the additional sections listed by clicking the corresponding add (+) button (s). The system then uses the user interactions to validate or update the description tag of the structured data for the listing.

FIG. 10E illustrates Date Posted tag review on the UI of FIGS. 9A-9B. The user clicks Date Posted and the predicted date, here Jul. 22, 2018, is displayed along with the prediction score (93%). A calendar enables the user to select a different date in case the machine prediction is incorrect. The system then uses the user interactions to validate or update the date posted tag of the structured data for the listing.

Figure 10F:
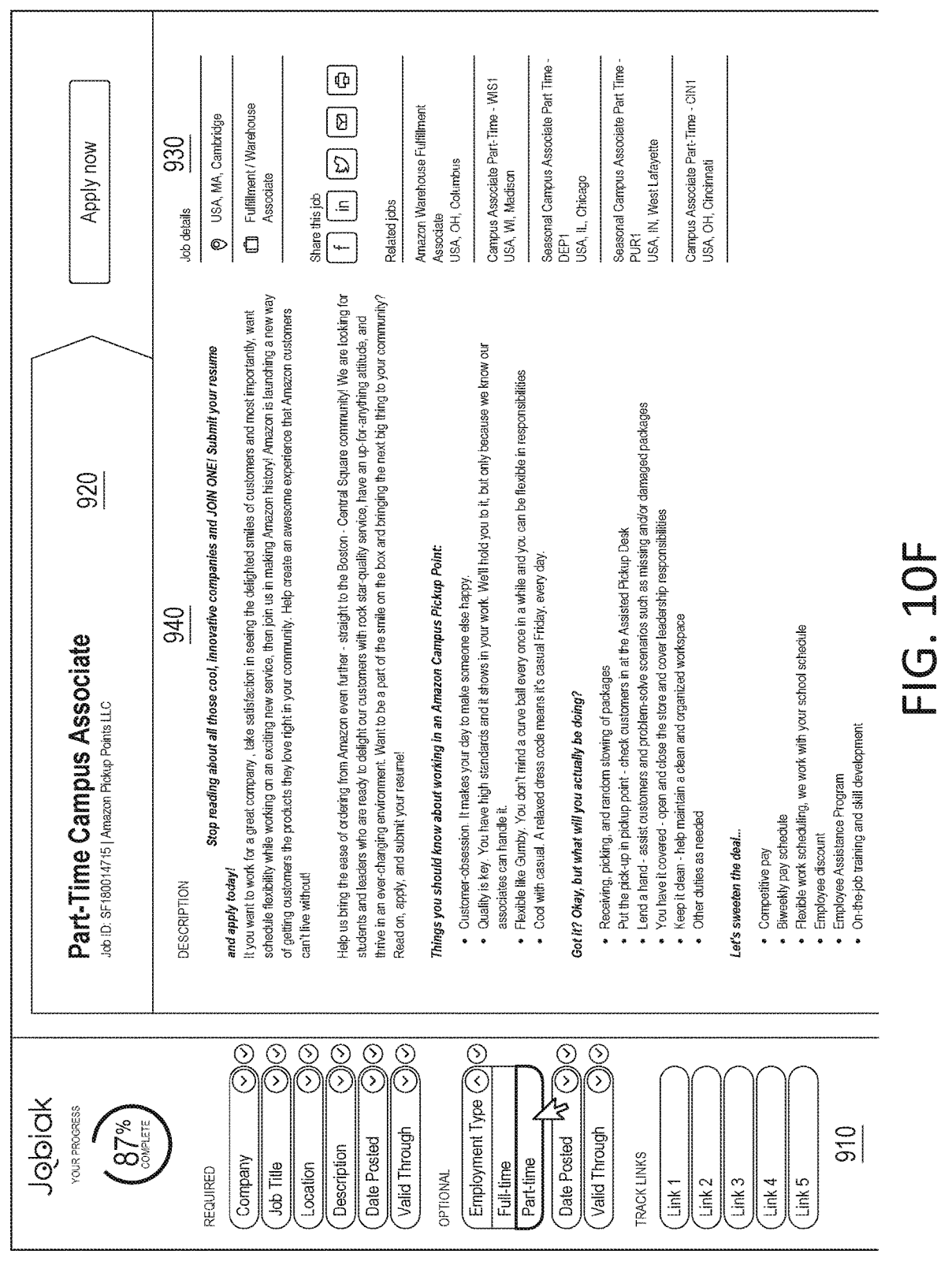

FIG. 10F illustrates Employment Type tag review on the UI of FIGS. 9A-9B. The user clicks the optional tag Employment Type, and a drop-down displays several alternative labels, here Full-time and Part-time. In some embodiments, optional tag labels may not be predicted automatically, ergo no prediction score is given. The user may select one of the alternative values. In this example, the user selection updates the center top panel 920 job title to include the selected type (Part-time). The system then uses the user interactions to validate or update the job type tag of the structured data for the listing.

FIG. 10G illustrates Salary tag review on the UI of FIGS. 9A-9B. In this example, a predicted salary is shown ($180, 000), and the user can optionally enter a new value or confirm the prediction. The system then uses the user interactions to validate or update the date posted tag of the structured data for the listing.

Figure 11:
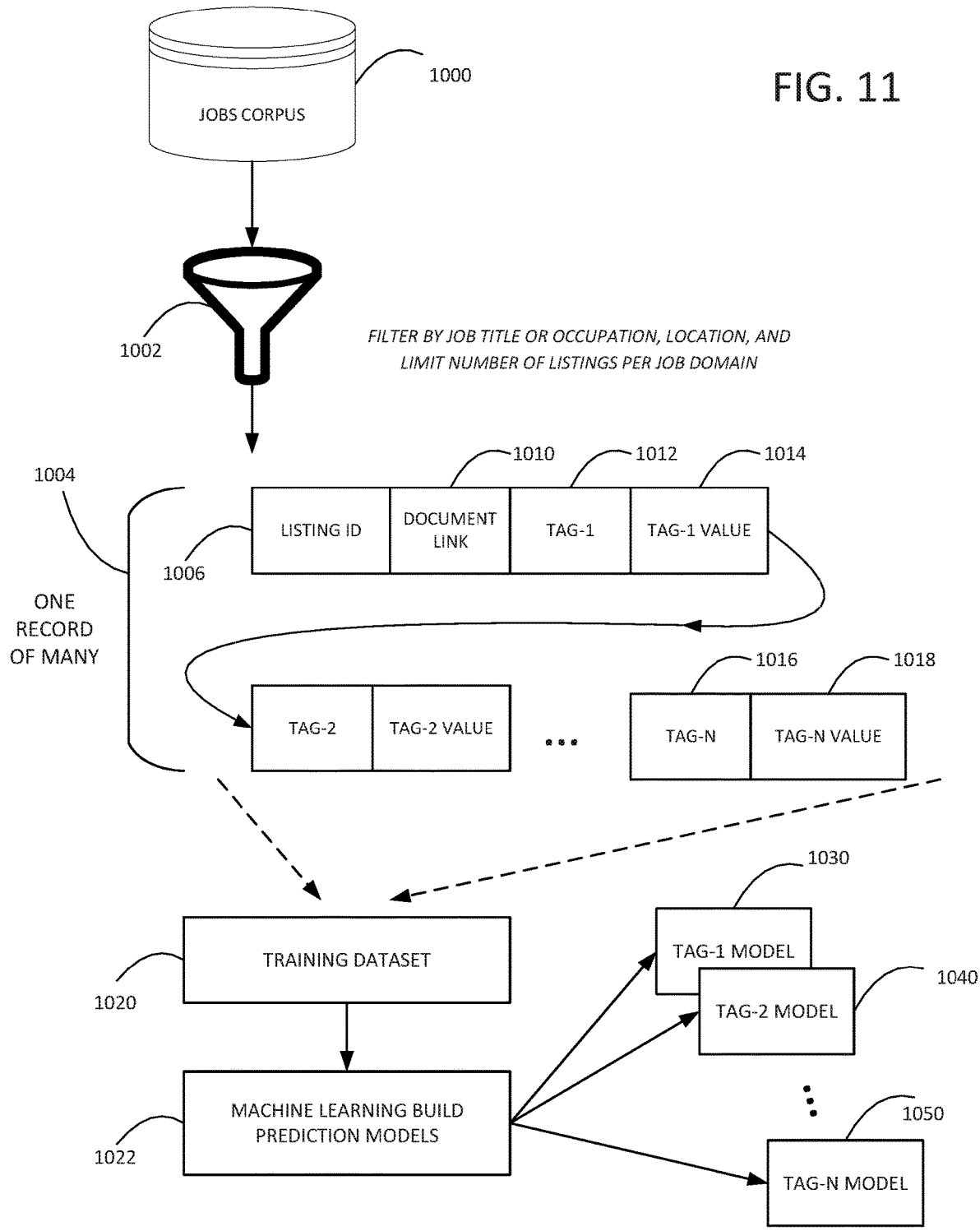
FIG. 11 is a simplified conceptual diagram of a process for building tag-specific ML prediction models for job listings.

FIG. 11 is a simplified conceptual diagram of a process for building tag-specific ML prediction models for job listings. Here, a job corpus 1000 is accessed and filtered 1002 as noted above. Reference 1004 is a conceptual illustration of a set of job listing records. Each record 1006 may contain plural fields or columns, for example, a listing ID, a document link 1010 (such as a URL), and a series of tag-value pairs, for example, TAG-1 and corresponding TAG-1

VALUE, fields 1012 and 1014, respectively. Additional pairs numbered 2 through N may be included, concluding the record with TAG-N, TAG-N VALUE fields, 1016 and 1018, respectively.

Some or all of the filtered records 1004 are used to form a training dataset 1020. Machine learning (ML) methods are used to build one or more prediction models from the training dataset, block 1022. In some cases, supervised learning methods may be used. Individual models (or sets or models) may be constructed for each one of plural tags, models 1030, 1040 . . . 1050. Some of these models and their uses are described above with regard to FIG. 5.

Most of the equipment discussed above comprises hardware and associated software. For example, the typical server is likely to include one or more processors and software executable on those processors to carry out the operations described. We use the term software herein in its commonly understood sense to refer to programs or routines (subroutines, objects, plug-ins, etc.), as well as data, usable by a machine or processor. As is well known, computer programs generally comprise instructions that are stored in machine-readable or computer-readable storage media. Some embodiments of the present invention may include executable programs or instructions that are stored in machine-readable or computer-readable storage media, such as a digital memory. We do not imply that a "computer" in the conventional sense is required in any particular embodiment. For example, various processors, embedded or otherwise, may be used in equipment such as the components described herein.

Memory for storing software again is well known. In some embodiments, memory associated with a given processor may be stored in the same physical device as the processor ("on-board" memory); for example, RAM or FLASH memory disposed within an integrated circuit microprocessor or the like. In other examples, the memory comprises an independent device, such as an external disk drive, storage array, or portable FLASH key fob. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such as a conventional rotating disk drive. All such memories are "machine readable" or "computer-readable" and may be used to store executable instructions for implementing the functions described herein.

A "software product" refers to a memory device in which a series of executable instructions are stored in a machine-readable form so that a suitable machine or processor, with appropriate access to the software product, can execute the instructions to carry out a process implemented by the instructions. Software products are sometimes used to distribute software. Any type of machine-readable memory, including without limitation those summarized above, may be used to make a software product. That said, it is also known that software can be distributed via electronic transmission ("download"), in which case there typically will be a corresponding software product at the transmitting end of the transmission, or the receiving end, or both.

Having described and illustrated the principles of the invention in a preferred embodiment thereof, it should be apparent that the invention may be modified in arrangement and detail without departing from such principles. We claim all modifications and variations coming within the spirit and scope of the following claims.

The invention claimed is:

1. A computer-implemented method comprising:
importing an electronic job listing document that includes a job listing;
selecting a published jobs schema that defines a plurality of tags;
for at least some of the tags defined by the jobs schema, provisioning a corresponding tag prediction ML model;
extracting text from the job listing;
processing the extracted text using each of the tag prediction models; to predict values for at least some the corresponding tags;
using the predicted values, generating structured data according to the jobs schema; and
inserting the structured data into the job listing document so as to enable a web site that utilizes the jobs schema to automatically recognize and import the structured data to the web site to post the job listing
wherein the jobs schema designates at least one of the set of tags as a required tag and designates at least one of the set of tags that is not a required tag as a recommended tag, and processing the extracted text includes:
provisioning a first machine learning prediction model for a first one of the required tags;
processing the extracted text using the first machine learning prediction model to generate a predicted value for the first required tag and return a prediction score for the predicted value;
comparing the prediction score to a predetermined threshold value;
in a case that the prediction score is at least equal to the threshold value,
incorporating the predicted value as the first required tag value in said generating the structured data.

2. The method of claim 1 and further comprising:
generating a tagging user interface ("UI") web page;
restricting access to the UI web page to one or more selected users;
presenting the predicted values in the UI web page;
validating, revising and/or adding data to the predicted values in response to user interaction on the UI web page; and
updating the structured data based on the user interaction on the UI web page.

3. The method of claim 2 and further comprising:
determining a prediction score for each of the predicted values;
for at least one of the predicted values, comparing the corresponding prediction score to a selected threshold value; and
in a case that the prediction score is not at least equal to the threshold value, designating the corresponding tag prediction as incomplete in the UI web page;
presenting one or more alternative prediction values for the corresponding tag in the UI web page;
selecting one or more of the predicted value and the alternative prediction values as a correct value based on user interaction on the UI web page; and
updating the structured data to use the correct value for the corresponding tag prediction.

4. The method of claim 3 including:
provisioning a data store to store user (employer) data for a client; and based on the user interactions of the client on the UI web site, storing or updating an indication of prediction models for each tag that work best with the client's job listing documents.

5. The method of claim 1 wherein the jobs schema designates at least one of the set of tags as a required tag and processing the extracted text includes:
provisioning a corresponding ML prediction model for predicting each one of the required tags;
for each one of the required tags, processing the extracted code using the corresponding prediction model to generate respective predicted values and prediction scores;
comparing each of the prediction scores to a corresponding threshold value;
for each one of the required tags where the corresponding prediction score is at least equal to the corresponding threshold value, incorporating the predicted value as the corresponding required tag value in said generating the structured data.

6. A computer-implemented method comprising:
importing an electronic job listing document that includes a job listing;
processing the job listing document to predict values for at least some of a set of html tags defined by a jobs schema;
using the predicted values, generating structured data according to the schema; and
inserting the structured data into the job listing document so as to enable a web site that utilizes the schema to automatically recognize and import the structured data to the web site to post the job listing;
wherein one of the html tags is job location and processing the extracted html code to predict job location value includes:
defining cities, states, regions and countries as classes of location components;
providing access to a lookup table for each of the defined classes;
parsing the extracted data to locate all qualified n-grams in the job body, where n is a selected integer;
filtering the qualified n-grams to include only those that have title case, wherein each word in the n-gram is capitalized, with the exception of interior prepositions;
separately searching each of the lookup tables based the filtered qualified n-grams;
for a matching lookup table entry, associating the matching n-gram as a label corresponding to the location component associated with the lookup table where the matching entry was found;
identifying all tag sequences with maximum length four in the original job body;
filtering the identified tag sequences to remove duplicates so as to form a set of remaining tag sequences;
applying a predetermined relative scoring scheme to the remaining tag sequences to form a set of scored tag sequences;
ranking the scored tag sequences according to the respective relative scores to form a ranked set of tag sequences; and
selecting a highest ranking one of the tag sequences as the predicted location label.

7. The method of claim 6 wherein n is between 1 and a maximum number of tokens among all of the lookup tables and the overall length of the n-grams are less than or equal to a maximum length among all the lookup tables.

8. The method of claim 7 including, in a case that more than one of the tag sequences shares the maximum score among all the tag sequences, selecting the tag sequence that occurs earliest in the original job body among the tag sequences that share the maximum score.

9. The method of claim 8 including, in a case that more than one tag sequence shares both the maximum score and the earliest position in the original job body, selecting the one whose combined terms form the longest result.

10. A computer-implemented method comprising:
importing an electronic job listing document that includes a job listing;
processing the job listing document to predict values for at least some of a set of html tags defined by a jobs schema;
using the predicted values, generating structured data according to the schema; and
inserting the structured data into the job listing document so as to enable a web site that utilizes the schema to automatically recognize and import the structured data to the web site to post the job listing;
wherein one of the html tags is salary and processing the extracted html code to predict salary value includes:
defining classes of salary designation including periodic salary, range salary, simple salary and descriptive salary;
defining a relative scoring value for each of the defined classes of salary designation;
searching the job body text for a highest scoring salary fragment using regular expressions corresponding to each of the salary classes and applying the relative scoring values;
returning the highest scoring salary fragment as the predicted label for the salary tag; and
using the predicted label for the salary tag in generating the structured data.

11. The method of claim 10 including:
qualifying a salary fragment as a range salary label only if one of the following key words appears in the job body text within approximately 20 characters preceding the amount: "pay", "rate", "salary", "wage", "compensation".

12. The method of claim 10 including:
qualifying a salary fragment as a simple salary label only if one of the following key words appears in the job body text within approximately 20 characters preceding the amount: "pay", "rate", "salary", "wage", "compensation", AND a currency symbol or code also appears adjacent the amount.

13. The method of claim 10 including:
qualifying a salary fragment as a descriptive salary label only if one of the following key words appears in the job body text within approximately 20 characters preceding the salary fragment OR approximately 10 characters following the amount: "pay", "rate", "salary", "wage", "compensation".

14. The method of claim 10 including:
generating a tagging user interface ("UI") web page;
presenting the predicted label for the salary tag in the UI web page;
validating or revising the predicted label for the salary tag responsive to user interaction on the UI web page; and
updating the structured data based on the user interaction on the UI web page.

15. A computer-implemented method comprising:
downloading an electronic job listing document that contains a job body;

based at least in part on the job listing document, predicting a job description label for the job listing, wherein predicting the job description label includes—
providing a jobs dataset as a corpus;
training a topic modeling process based on Latent Dirichlet Allocation to discover a job description topic in the dataset, wherein the job description topic consists of a probability distribution over words of a vocabulary;
executing a binary sentence classifier process to identify sentences in the document that include words of the vocabulary of the job description topic;
designating sentences identified by the sentence classifier as job description sentences;
executing a density-based algorithm to locate a section of the job body that contains a highest number of the job description sentences; and
capturing the located section of the job body as a predicted job description label.

16. The method of claim 15 including:
generating a tagging user interface ("UI") web page;
presenting the predicted job description label in the UI web page;
validating or revising the job description label responsive to user interaction on the UI web page; and then
inserting the job description label into the html electronic job listing document to enable a web site bot to automatically recognize and import the job listing into a web site to post the job listing.

17. The method of claim 16 wherein generating a tagging user interface ("UI") web page includes:
displaying plural predicted job description labels; and
providing controls arranged to enable a user to selectively include or exclude each of the plural predicted job description labels in forming structured data associated with the html electronic job listing document.

18. The method of claim 17 wherein the tagging user interface ("UI") web page is configured to update a display of the job listing responsive to the user interactions to selectively include or exclude each of the plural predicted job description labels.

19. A computer-implemented method comprising:
receiving a machine-readable job listing document including job body text;
transforming the job listing document into an html document;
processing the html document to predict values for at least some of a set of html tags defined by a jobs schema;
wherein processing the html document to predict values includes:
defining classes of at least one of the tag fields defined by the jobs schema;
extracting text from the job listing document;
searching the job body text using regular expressions corresponding to each class to find n-grams or fragments;
applying relative scoring values (weighting) per each of the classes;
select the highest scoring n-gram or fragment for a selected class; and
returning the selected n-gram or fragment as the predicted value for the selected class;
using the predicted values, generating structured data according to the schema;
inserting the structured data into the html document; and
publishing the html document on the internet so as to enable a web site that utilizes the schema to automatically recognize and import the structured data to the web site to post the job listing.

20. The method of claim 19 wherein:
the said one of the tagged fields is salary; and
the classes of the salary field include:
periodic salary, range salary, simple salary, and a descriptive salary.

* * * * *